United States Patent

Gudimenko et al.

[11] Patent Number: 5,948,484
[45] Date of Patent: Sep. 7, 1999

[54] MODIFICATION OF SUBSURFACE REGION OF POLYMERS AND CARBON-BASED MATERIALS

[76] Inventors: Yuri Gudimenko, 437 Glen Park Ave., Apartment #207, North York, Canada, M6B 2E8; Jasha I. Kleiman, 205 Chelwood Dr., Thornhill, Canada, L4J 7C3; Grant R. Cool, 68 Castlewood Ave., Timmins, Canada, P4R 1L5; Zelina A. Iskanderova, 299 Mullen Dr., Apartment #95, Thornhill, Canada, L4J 3W3; Roderick C. Tennyson, 104 McClure Dr., King City, Canada, L0G 1K0

[21] Appl. No.: 08/870,068

[22] Filed: Jun. 5, 1997

Related U.S. Application Data

[63] Continuation-in-part of application No. PCT/CA96/00421, Jun. 21, 1996, which is a continuation-in-part of application No. 08/493,535, Jun. 22, 1995, abandoned.

[51] Int. Cl.$^6$ ..................................................... B05D 3/06
[52] U.S. Cl. ........................ 427/489; 427/491; 427/503; 427/515; 427/536; 427/539; 427/551; 427/556; 427/558
[58] Field of Search ..................................... 427/489, 491, 427/496, 583, 508, 515, 533, 536, 539, 551, 552, 553, 556, 558

[56] References Cited

U.S. PATENT DOCUMENTS

| | | |
|---|---|---|
| 4,094,756 | 6/1978 | Taylor . |
| 4,233,427 | 11/1980 | Bargain et al. . |
| 4,374,158 | 2/1983 | Taniguchi et al. . |

(List continued on next page.)

FOREIGN PATENT DOCUMENTS

| | | |
|---|---|---|
| 0046954 | 3/1982 | European Pat. Off. . |
| 0311989 | 4/1989 | European Pat. Off. . |
| 0370269 | 5/1990 | European Pat. Off. . |
| 2664282 | 1/1992 | France . |
| 2022052 | 12/1970 | Germany . |
| 4009624 | 10/1991 | Germany . |
| 4210594 | 6/1993 | Germany . |
| 2182336 | 3/1987 | United Kingdom . |
| 9520006 | 7/1995 | WIPO . |

OTHER PUBLICATIONS

Shaw et al., "Simplified Silylation Process", J. Vac. Sci. Technol. B7(6), pp. 1709–1716, Nov./Dec. 1989.
Baik et al., "Gas Phase Silylation in the DESIRE Process", J. Vac. Sci. Technol. B8(6), pp. 1481–1487, Nov./Dec. 1990.
Baik et al., "Comparative Study Between Gas– and Liquid–Phase Silylation", J. Vac. Sci. Technol. B9(6), pp. 3399–3405, Nov./Dec. 1991.
Johansson, "Overview of Recent Glass Coatings Developments", Pharmaceutical and Medical Plastics Packaging '93 (SPE), Jun. 22–23, 1993, Complete Document.

(List continued on next page.)

*Primary Examiner*—Erma Cameron
*Attorney, Agent, or Firm*—Riches,McKenzie & Herbert

[57] ABSTRACT

An an improved process for surface modification of solid substrates, such as polymers and carbon-based materials, is disclosed. The preferred process comprises three steps: a first activation step wherein reactive hydrogen groups are formed in a surface layer of a polymeric or carbon-based material; a second silylation step wherein the reactive hydrogen groups are reacted with a silylating agent to form silicon-containing groups; and a third stabilization step wherein an upper portion of the activated, silylated layer is oxidatively converted to a silicon and oxygen enriched surface layer. The process can be performed using materials not having pre-existing reactive hydrogen groups or precursor groups. Modified materials according to the present invention have improved properties, such as erosion resistance and oxygen and water barrier properties, and are potentially useful in numerous industries, such as aerospace and packaging.

20 Claims, 5 Drawing Sheets

U.S. PATENT DOCUMENTS

| | | |
|---|---|---|
| 4,400,509 | 8/1983 | Bruynes et al. . |
| 4,518,787 | 5/1985 | Treadgold . |
| 4,560,577 | 12/1985 | Mirtech et al. ............................ 427/38 |
| 4,624,859 | 11/1986 | Akira et al. . |
| 4,782,008 | 11/1988 | Babich et al. . |
| 4,782,009 | 11/1988 | Bolon et al. . |
| 4,808,511 | 2/1989 | Holmes . |
| 4,818,624 | 4/1989 | Downey, Jr. . |
| 4,830,873 | 5/1989 | Benz et al. . |
| 4,874,643 | 10/1989 | Oldham et al. ......................... 427/340 |
| 4,938,992 | 7/1990 | Mears . |
| 4,957,588 | 9/1990 | Koshiba et al. . |
| 4,980,206 | 12/1990 | Torre et al. .......................... 427/385.5 |
| 4,981,909 | 1/1991 | Babich et al. . |
| 4,999,280 | 3/1991 | Hiraoka . |
| 5,023,164 | 6/1991 | Brunsvold et al. . |
| 5,041,362 | 8/1991 | Douglas . |
| 5,047,526 | 9/1991 | Yamamoto . |
| 5,064,748 | 11/1991 | Bobbio . |
| 5,082,872 | 1/1992 | Burns et al. . |
| 5,094,936 | 3/1992 | Misium et al. . |
| 5,098,618 | 3/1992 | Zelez . |
| 5,108,875 | 4/1992 | Thackeray et al. . |
| 5,110,711 | 5/1992 | Babich et al. . |
| 5,116,715 | 5/1992 | Roland et al. . |
| 5,136,074 | 8/1992 | Shirahata . |
| 5,139,925 | 8/1992 | Hartney . |
| 5,212,028 | 5/1993 | Fujino . |
| 5,215,790 | 6/1993 | Koontz . |
| 5,215,867 | 6/1993 | Stillwagon et al. . |
| 5,229,172 | 7/1993 | Cahalan et al. . |
| 5,229,258 | 7/1993 | Sezi et al. . |
| 5,262,283 | 11/1993 | Sezi et al. . |
| 5,271,800 | 12/1993 | Koontz . |
| 5,286,599 | 2/1994 | Babich et al. . |
| 5,314,857 | 5/1994 | Koontz . |
| 5,318,870 | 6/1994 | Hartney . |
| 5,320,875 | 6/1994 | Hu et al. . |
| 5,332,551 | 7/1994 | Koontz . |
| 5,362,606 | 11/1994 | Hartney et al. . |
| 5,366,852 | 11/1994 | Pavelchek et al. . |
| 5,368,901 | 11/1994 | Leuschner et al. . |
| 5,424,131 | 6/1995 | Wertheimer et al. . |
| 5,683,757 | 11/1997 | Iskanderova et al. ................... 427/525 |

OTHER PUBLICATIONS

Hartney et al., "Comparison of Liquid– and Vapor–Phase Silylation", Optical Engineering, vol. 32 No. 10, pp. 2382–2387, Oct., 1993.

Roland, "Silylation and Dry Processing", Advanced Materials for Optics and Electronics, vol. 4, 129–138 (1994).

Gozdz, "Progress in the Chemistry of Organosilicon Resists", Polymers for Advanced Technologies, vol. 5, pp. 70–78, 1994.

Gogolides et al., "Lithographic Evaluation of a New Wet Silylation Process", Microelectronic Engineering 23 (1994) 267–270.

"Polymer develops oxide layer, resists atomic–oxygen erosion", Advanced Materials & Processes Apr. 1995, p. 12.

Dever, "Low Earth Orbital Atomic Oxygen and Ultraviolet Radiation Effects on Polymers", NASA Technical Memorandum 103711, Feb. 1991, entire document.

Tennyson, "Atomic Oxygen Effects on Polymer–Based Materials", Canadina Journal of Physics, vol. 69, No. 8 and 9, Aug.–Sep. 1991, pp. 1190–1208.

Alvino, "Ultraviolet Stability of Polyimides and Polyamide–s–Imides", J. Appl. Polym. Sci., 15, 2123, (1971).

Mimura and Kotaka, "A New Photochemical Selective Silylation Technique for Resist Materials", Jpn. J. Appl. Phys., 33, 2789, (1994).

Blais et al., "Photochemical Degredation of Poly(ethylene Terephthalate).IV.Surface Changes", J. Appl. Polym. Sci., 17, 1895, (1973).

Peeling, "Surface Ozonation and Photooxidation of Polyethylene Film", J. Polym. Sci.: Polymer Chemistry Edition, 21, 2047, (1983).

Gugumus, "Photo–Oxidation and Stabilization of Polyethylene", in Mechanisms of Polymer Degradation and Stabilization, ed. G. Scott, Elsevier, 169, (1990).

Shard and Badyal, "Surface Oxidation of Polyethylene, Polystyrene and PEEK: The Synthon Approach", Macromolecules, 25, 2053, (1992).

Plechaty and Thomas, "Chemical Surface–Modification of a Polyimide: Characterization and a Kinetic Study on the Diffusion of Ions in a Modified Polymer", J. Electrochem. Soc., 139, No. 3, 810, (1992).

Ferain and Legras, "Modification of PEEK model compounds and PEEK film by energetic heavy ion and ultraviolet irradiations", Nuc. Inst. and Methods in Phys. Research, B83, 163, (1993).

Munro et al., "Surface Photo–oxidation of Phenoxy Resin and Polyetheretherketone", Polym. Degrad. and Stab., 19, 353, (1987).

Encyclopedia of Polymer Science and Engineering, vol. 12 (pp. 674–689), 1985.

NaOH hydrolysis of polyimide (Step I) to form sodium salt of polyamic acid followed by acidification (Step II) to form polyamic acid.

MODIFICATION OF SUBSURFACE REGION OF POLYMERS AND CARBON-BASED MATERIALS

This application is a continuation-in-part application of PCT International patent application Ser. No. PCT/CA96/00421 designating the United States, filed on Jun. 21, 1996, which is a continuation-in-part application of U.S. patent application Ser. No. 08/493,535, filed on Jun. 22, 1995, now abandoned.

FIELD OF THE INVENTION

This invention relates to a process for modification of solid substrates, such as polymers and carbon-based materials, which provides materials having enhanced characteristics, for example enhanced atomic oxygen erosion resistance, weather resistance and new surface properties.

BACKGROUND OF THE INVENTION

Polymeric solids have many unique advantages over other materials and have therefore risen in importance in recent years. For example, polymers are lightweight, can be molded into intricate shapes, are corrosion resistant, have versatile electronic properties and low manufacturing costs. However, due to their inherently low melting temperatures and susceptibility to degradation in oxidizing and/or UV environments, their use has been generally limited to environmentally mild service applications. Carbon-based composite materials, for example, carbon fiber-reinforced plastic (CFRP) composites and carbon fiber-carbon composites, are light weight, tough and rigid, making them very attractive materials for spacecraft components. However, like polymers, composites are also eroded in extremely oxidative environments.

The use of polymers and composites in spacecraft applications exemplifies this problem. To date, the widespread use of polymers and composites in space, on a prolonged basis, has not been possible due to their low erosion resistance in the presence of oxygen, particularly the active oxygen species, such as atomic oxygen, that can be found in the residual atmosphere surrounding the Earth in low earth orbit (LEO).

The LEO space environment contains atomic oxygen formed in the ionosphere through dissociation of $O_2$ by vacuum ultraviolet radiation (VUV) having a wavelength in the range of about 100 to 200 nm. The predominant species in the LEO environment, at altitudes between 200 and 700 km, is atomic oxygen (AO). Even at higher altitudes, AO remains a significant constituent.

AO density in LEO is not particularly high at the altitudes of most orbiting vehicles, such as satellites. For example, the number density of AO at about 250 km altitude is $10^9$ atoms/cm$^3$, which corresponds to the density of residual gas in a vacuum of $10^{-7}$ torr. However, due to the high orbital velocity (approximately 8 km/sec at space shuttle altitude) of orbiting vehicles, the flux is high, being of the order of $10^{15}$ atoms/cm$^2$ sec. Furthermore, this high orbital velocity gives the impacting oxygen considerable energy, about 5.3 eV. AO having kinetic energy above about 1 eV, and more typically in the range of from about 2 eV to about 5 eV, is commonly referred to as "fast atomic oxygen" (FAO) or "hyperthermal atomic oxygen" (HAO).

Polymeric materials, graphite and carbon-based composite materials exposed to such energetic FAO have been shown to undergo surface erosion and mass loss. Over time, this surface erosion can result in degradation and failure of these materials. In addition, eroded materials exhibit a significantly altered surface morphology, the surface being roughened, often producing a micron scale, "carpet-like" texture.

It has been found that erosion theoretically attributable to FAO alone does not adequately account for the observed rate of erosion of certain polymeric materials. It is believed that FAO and UV in the LEO environment act synergistically to accelerate degradation of these polymeric materials. Furthermore, although atomic oxygen and UV radiation cause the most damage to polymeric surfaces, polymers may also be damaged in space by thermal cycling and micrometeoroid/debris impact.

Many different types of polymers and composites have been examined in LEO flight and in ground based FAO testing facilities. Polymers which are commonly considered for use in the LEO environment include Kapton™ polyimide, FEP teflon (fluorinated ethylene propylene), PFE teflon (polytetrafluoroethylene), Mylar™ (Polyethylene terephthalate), and PEEK™ (poly ether ether ketone). Also used are composite materials such as carbon fiber-carbon composites comprising carbon fibers in a resin-derived carbon matrix, and CFRP composites such as carbon fibers bonded with epoxy resins or PEEK.

Kapton and epoxies have LEO erosion yields of about $(2.5-3) \times 10^{-24}$ cm$^3$/at, which translates to $(3-4) \times 10^{-24}$ g/atom of atomic oxygen. Many other polymers and carbon-based materials, such as graphite, carbon fiber-carbon composites and CFRP composites also have erosion rates of this order of magnitude, typically about $(1-4) \times 10^{-24}$ g/atom. Perfluorinated polymers are an exception, because of the fluorine in their bonding structure, their erosion yields are much lower. Although it was once thought that perfluorinated polymers were an answer to the problems of polymers in LEO, there is a synergistic effect between atomic oxygen and VUV radiation that increases the erosion yield to unacceptable levels. Materials having erosion yields on the order of $10^{-24}$ g/atom are unsuitable for long term use in the LEO environment, and space in general.

In CFRP or carbon fiber-carbon composites, the top 10–20 µm of material usually consists of a polymeric or carbon matrix, respectively, with carbon or graphite fibers bonded in the matrix below the surface. In long-duration space missions, erosion of both the matrix and the carbon fibers has been observed. These materials have erosion rates on the order of $10^{-24}$ g/atom and are therefore unsuitable for long term use in the LEO environment without alteration or protection.

Some specialized polymeric materials have been developed having acceptable erosion resistance for use in short term space flights. However, the cost of developing new materials for use in space is very high. Therefore, it is preferred to use existing, industrially produced polymeric materials due to their lower cost, wide availability and well understood properties. In particular, it is preferred to surface-modify existing polymers to improve their erosion resistance while retaining the properties of the unmodified bulk polymer.

The advantages of using existing organic polymers has forced the development of a wide variety of protection schemes, ranging from simple blankets of glass cloth to sophisticated thin film coatings. It is known that these coatings are most often fashioned using silicon dioxide. The coatings comprise thin films deposited by chemical vapor deposition or electron or ion beam sputtering onto the polymer surface to act as a barrier between the polymer and atomic oxygen.

An example of such a thin film coating is disclosed in U.S. Pat. No. 5,424,131 (Wertheimer et al.). Wertheimer teaches the deposition of a thin barrier film, preferably via a plasma, on the surface of an organic polymer such as Kapton, Mylar or epoxy resin. The materials comprising the films are plasma polymers, inorganic insulating films, and semiconducting and conductive materials. As shown in the examples of Wertheimer, all of these materials preferably contain silicon. After the polymers were coated, they were exposed to oxygen atoms in a simulated LEO environment. Although not disclosed by Wertheimer, this exposure to oxygen atoms would convert the silicon-containing coating on the polymer surface into a coating of silicon dioxide.

In one example of Wertheimer, Kapton is coated with a thin film of the plasma polymer hexamethyldisiloxane and subsequently exposed to AO. A skin of $SiO_2$ forms on top of the plasma polymerized HMDSO coating during the initial stages of AO exposure, thereby protecting it from further attack and fulfilling the protection from the AO exposure. However, the cyclic mode of degradation of siloxane protective coatings in an oxygen environment implies an induction period prior to the onset of measurable degradation. This may be the reason why the siloxane materials flown in short duration space shuttle flights have appeared to be stable over the time period during which they were exposed. For extended space flights, however, these coating materials have a finite lifetime determined by their thickness and the AO flux. This problem is widely recognized in the space community.

Therefore, although $SiO_2$ coated materials such as those taught by Wertheimer have improved resistance to atomic oxygen, they are unsuitable for use in space on a long term basis.

It has also been found that when coated materials are exposed to constant thermal cycling, as in the LEO environment, cracking and spalling of the coating quickly occur leaving the underlying polymer exposed. This results in the erosion of the exposed polymer, erosion that is enhanced by undercutting of the coating, causing rapid widening and deepening of the cracked and eroded area. It is believed that the cracking and spalling in oxide coatings is primarily caused by the difference between the coefficient of thermal expansion of the coating and that of the underlying bulk material, and also due to interfacial stresses at the interface between the coating and the bulk material. High interfacial stresses in coated materials are caused by the typically sharp transition between the coating and the underlying bulk material. In order to provide full protection in the LEO environment, any new protection scheme must have resistance to thermal stress induced cracking and spalling.

It is known that selective silylation processes are used with positive polymer-based photoresists in the manufacture of semiconductor devices. The $SiO_2$ type enriched layer of these photoresists is typically formed by silylation of active groups in exposed areas of the photoresist followed by plasma development of the resist by reactive oxygen plasma etching. The $SiO_2$ type enriched layer is typically formed during the first few moments of etching. Silylated areas of the surface are etched at a lower rate than unsilylated areas, resulting in an etched pattern in the surface of the photoresist.

As shown in the prior art, the polymer comprising the photoresist must contain reactive hydrogen groups such as COOH (carboxyl), OOH, OH, NH and SH in order to react with the silylating agent. The silylating agent reacts with the reactive hydrogen group, replacing the hydrogen atom with a silyl group.

The requirement that the polymer contain reactive hydrogen groups limits the types of polymers which may be silylated. Typically this process has been used only to silylate polymers having phenolic hydroxyl groups, such as novolak resins, or those polymers having reactive precursor groups. Known precursor groups are o-nitrobenzene derivatives and other compounds which undergo photo-Fries rearrangement, or epoxides, which undergo ring opening by chemical means, to form reactive hydrogen groups. An example of a process for silylating polymers having reactive hydrogen groups or active hydrogen precursor groups is taught by Babich in U.S. Pat. No. 4,782,008.

It is also known that UV radiation can initiate oxidation of a polymer by molecular oxygen, and change the surface characteristics thereof. For example, in U.S. Pat. No. 5,098,618, Zelez teaches that UV irradiation of polymers in the presence of oxygen is believed to produce oxide and possibly hydroxide sites on polymer surfaces not previously containing oxygen. However, Zelez deals primarily with improving hydrophilicity of polymer surfaces, and no effort is made to quantify the relative amounts of reactive hydrogen groups and other oxygen-containing groups produced by irradiation. It is likely that the high energy of irradiation used by Zelez (about 10–15 mWatts/cm$^2$) would result primarily in the production of ketone carbonyl groups and would produce relatively few hydroxyl or other reactive hydrogen groups.

Despite the fact that separate processes are known to: 1) perform silylation of polymers, ie. convert active hydrogen groups to silyl groups, and 2) introduce oxygen into a polymer surface that did not previously contain oxygen, no complete process has been developed that successfully applies these concepts to the production of polymer materials that, for example, have superior resistance to degradation in a highly oxidizing environment, such as in LEO.

Firstly, no processes are known that allow a wide range of organic polymers to be silylated. As discussed above, silylation has only been demonstrated for polymers having reactive hydrogen functional groups or reactive hydrogen functional precursor groups. If, again, spacecraft applications are used as an example, it can be said that none of the polymer materials traditionally used have been silylated. The simple reason for this is that these polymers have high thermal, chemical and mechanical stability and are therefore difficult to surface-modify chemically. The technique of silylation has not been applied, previous to this development, because these polymers do not contain reactive functional groups or reactive functional precursor groups which may be readily converted. In other words, these polymers are substantially unreactive with silylating agents.

Secondly, it has not been specifically demonstrated that a large number of reactive hydrogen groups can be produced on the surface of the polymers mentioned above. The production of the reactive hydrogen groups, which must be present in very specific forms and of very high quantity, has only been demonstrated in a cursory fashion in a non-related manner, as for example by the above-mentioned Zelez patent in the simple control of hydrophobicity.

Thirdly, to date it has not been possible to provide a silicon and oxygen enriched layer on the surface of a polymer which would not be subject to cracking and/or spalling in high thermal stress environments, such as the LEO environment.

As a second example, the requirements for barrier films in the packaging industry mirror, in many ways, the requirements of the aerospace industry. The film materials must be stable in oxidizing environments (food contact and heat), maintaining low permeation of water vapor and oxygen, for example. Once again the materials that are traditionally used, such as polyethylene and polyethylene terephthalate, do not contain reactive hydrogen groups or reactive precursor groups that can be converted, and therefore substantially unreactive with silylating agents. Like the aerospace polymers, barrier films have never been silylated or surface modified to form a silicon dioxide enriched surface layer, due to the difficulty of forming new chemical bonds with these materials. It is known that providing a thin film coating of silicon dioxide on packaging films by chemical vapor deposition will enhance the oxygen and water vapor barrier properties of the film. However, at the present time, such films are costly to produce and the deposited oxide film is subject to cracking and spalling under mechanical stress, for example when the material is handled roughly, crushed, bent or folded.

SUMMARY OF THE INVENTION

To overcome the above disadvantages, the inventors have developed a new process of modification of a solid substrate selected from the group comprising organic polymers, metallized polymer films, graphite, carbon fiber reinforced composite materials, polymer-based coatings on metal substrates and polymer-based textile materials. In one aspect, the process of the invention provides a silicon and oxygen enriched surface region having erosion resistance in a LEO space environment substantially higher than that of polymer materials presently used for space applications. The silicon and oxygen enriched surface region does not show a tendency to crack and spall in thermal cycling tests. When mechanically induced cracking occurs, self-healing is possible under certain circumstances, reducing damage to the underlying substrate. The modified substrates of the invention also show decreased permeation values for water vapor and oxygen, control of hydrophobicity and in some cases changes in properties such as friction coefficient, surface resistivity, UV/Optical/IR transmission, resistance to weathering and improved adhesion.

The surface modification process according to the present invention comprises at least the following two steps:

1. Surface activation of the solid substrate, wherein reactive hydrogen groups such as OH, OOH and COOH groups are formed in a surface region of the substrate; and
2. Silylation of at least a portion of the reactive hydrogen groups in the surface region of the substrate with a silylating agent, whereby silicon-containing groups of the silylating agent become incorporated in the surface region of the substrate.

The surface activation step does not require preexisting reactive hydrogen or reactive hydrogen precursor groups to be present in the substrate. In fact, the unmodified substrate is preferably substantially unreactive with silylating agents. Preferably, the activation step comprises exposure of the substrate to a combination of UV radiation and oxygen, thus photo-oxidizing the substrate. However, for certain substrates, a "wet" activation step may also be used. For example, for polyimides, the activation step may alternately comprise base hydrolysis and subsequent acidification to form polyamic acid, which contains carboxyl groups.

The surface activation is carried out under conditions which lead specifically to the formation of a high concentration of reactive hydrogen groups in a surface region of the substrate, the reactive hydrogen groups being COOH, OOH and OH. It is to be appreciated that these reactive hydrogen groups are chemically bonded to the polymer molecules comprising the surface region of the substrate. Preferably, a graded transition is formed between the activated surface region and the underlying, unmodified substrate, referred to throughout the specification as "bulk substrate".

After surface activation, the reactive hydrogen groups in the surface region of the substrate are reacted with a silylating agent, replacing the hydrogen atoms of the active hydrogen groups by silicon-containing groups. Preferred silylating agents are those containing organosilicon groups which become built into the polymer molecules of the surface region of the substrate. The silylation reaction may either be a "gas phase" reaction wherein the surface of the substrate is exposed to a vapor of silylating agent, or may be a "liquid phase" reaction wherein the surface of the substrate is contacted with a solution containing the silylating agent.

Preferably, the degree of silylation is such that substantially all of the reactive hydrogen groups in the surface region of the substrate are replaced by silicon-containing groups, also referred to herein as "silyl groups", and a graded transition is produced between the silylated surface region and the underlying bulk substrate.

The process of the present invention preferably includes a third, oxidative stabilization step, wherein the silicon-containing polymer chains in at least an outer portion of the surface region of the substrate are converted into stable structures enriched with silicon and oxygen. Preferably, after oxidative stabilization, the surface of the substrate comprises C, O and Si, with the Si content being from about 20 atom percent to about 40 atom percent. Preferably, the outer portion of the surface region has an erosion yield on the order of or less than about $10^{-26}$ g/atom of atomic oxygen when the surface of the substrate is exposed to atomic oxygen having a kinetic energy of from about 1 eV to about 5.3 eV.

The preferred oxidative stabilization step comprises exposure of the surface of the silylated substrate to UV in the presence of oxygen, as in the preferred activation step. Alternatively, the oxidative stabilization step may comprise exposure of the surface of the silylated substrate to FAO, oxygen plasma, or corona discharge.

It is to be appreciated that the high density of reactive hydrogen groups produced in the surface region of the substrate provides a large number of reactive sites with which to react with the silylating agent. This allows a high concentration of silicon to be incorporated into the surface region of the substrate. The high concentration of silicon incorporated into the surface region of the substrate is at least partially responsible for the greatly improved erosion yields of the surface modified substrates of the present invention.

Furthermore, graded transitions are formed between the modified surface region of the substrate and the underlying bulk substrate, and also between the stabilized outer portion of the surface region and the remainder of the surface region. Therefore, there are no sharp interfaces between these various regions of the substrate having differing compositions. Sharp interfaces are not formed because the process of the present invention involves the original polymer molecules in the subsurface of the substrate, as contrasted with a coating which is deposited on the surface of the substrate.

It is also possible that the entire silylated surface region is oxidatively stabilized, in which case a graded transition exists between the silicon and oxygen enriched outer portion of the surface region and the underlying bulk substrate.

Therefore, in the process of the invention, the bulk of the substrate is bonded chemically through this graded transition region to the modified surface. Substrates treated with the surface modification process of the present invention have been shown to resist cracking and spalling in temperature cycling experiments. It is believed that this improved resistance to temperature cycling is a result of the graded nature of the transitions between the modified surface region of the substrate and the underlying unmodified substrate, and between the outer portion of the surface layer and the remainder of the surface layer.

In contrast, materials comprised of layers, such as those comprising a coating deposited on the surface of a substrate, have a sharply defined interface between the coating and the substrate. In such materials, thermal and mechanical stresses, such as those which may be produced by temperature cycling in the LEO environment, tend to concentrate at interfaces between layers, causing failure of the material at these interfaces. Therefore, surface-modified materials of the present invention are expected to have better resistance to thermal and mechanical stresses, such as those caused by temperature cycling in the LEO environment, than known materials simply coated with silicon dioxide, such as those taught by the Wertheimer patent.

As discussed above, preferably only an outer portion of the silylated surface region of the substrate is oxidatively stabilized. Therefore, an inner portion of the surface region preferably remains unstabilized and contains silicon-containing groups in the polymer chains. This underlying, inner portion of the surface region provides the modified substrate with "self-healing" properties. For example, if the silicon and oxygen enriched outer portion of the surface region is damaged while the modified material is exposed to a LEO space environment, FAO will cause a new silicon and oxygen enriched outer portion to form on the exposed portion of the inner portion of the surface region. Further, even if surface cracks form, the self healing properties will substantially prevent deepening and widening of the cracks caused by undercutting and thereby minimize damage to the underlying bulk substrate.

Once the highly protective silicon and oxygen enriched outer portion of the surface region is formed, there is substantially no mass loss when the modified substrate is exposed to a FAO beam. Thus, substrates modified according to the present invention would be expected to withstand use for extended periods of time in space, and particularly in a LEO space environment.

Although the process of the present invention may be used to produce erosion resistant materials for space applications, it is not limited thereto. Because the process of the present invention is not limited to substrates having reactive hydrogen groups, it may be used on a wide variety of commercially available substrates.

The process of the present invention preferably may also alter properties other than erosion resistance, such as hardness, wear resistance, coefficient of friction, lubricity, optical properties, terrestrial weatherability, adhesion, soiling resistance and wettability.

Further, the process of the present invention can be conveniently performed on substrates in virtually any form, including thin films, coatings, shaped articles, fabrics and fibers.

Therefore, the process and the surface modified substrates according to the present invention may be useful in a variety of industries, such as packaging, automotive, electronics, biomedical, building products, textiles, clothing, etc.

The surface modification process of the present invention can be successfully used on thin packaging films, for example, transparent packaging films used in food and pharmaceutical packaging. Thin polymer films treated by the process of the present invention have improved resistance to moisture and oxygen permeation when compared to many packaging films presently used, due to the barrier properties of the silicon and oxygen enriched outer portion of the surface region.

It is one object of the present invention to provide a surface modification process for producing materials having improved erosion resistance in a LEO space environment.

It is another object of the present invention to provide surface modified materials having improved erosion resistance in a LEO space environment.

It is yet another object to provide surface modified polymeric packaging films having improved resistance to oxygen and water permeation.

It is yet another object to provide a surface modification process for producing polymeric packaging films having improved resistance to oxygen and water permeation.

It is yet another object of the present invention to provide a surface modification process for altering surface properties of solid substrates.

It is yet another object of the present invention to provide a surface modification process for producing polymeric materials having a graded outer portion of a surface region which is enriched with silicon and oxygen.

It is yet another object of the present invention to provide a process for surface modification of a solid substrate comprising producing reactive hydrogen groups in a surface region of a solid substrate not having preexisting reactive hydrogen groups or reactive hydrogen precursor groups, and subsequent silylation of the active hydrogen groups produced in the surface region.

It is yet another object of the present invention to provide surface modified substrates, wherein reactive hydrogen groups have been produced in a surface region of the substrate, the substrate not having pre-existing reactive hydrogen groups or reactive hydrogen precursor groups, the reactive hydrogen groups being subsequently silylated with a silylating agent.

In one aspect, the present invention provides a process for modification of a surface of a solid substrate selected from the group comprising organic polymers, metallized polymer films, graphite and carbon fiber reinforced composite materials, the substrate prior to modification being substantially unreactive with a silylating agent, the process comprising: irradiation of the surface of the substrate with a dose of ultraviolet radiation, in the presence of oxygen, sufficient to cause the formation of reactive hydrogen groups in a surface region of the substrate, wherein the dose of ultraviolet radiation is from about 0.7 J/cm$^2$ to about 5 J/cm$^2$ and the reactive hydrogen groups are selected from one or more members of the group comprising OH, OOH and COOH groups; silylation of at least a portion of the reactive hydrogen groups in the surface region of the substrate with the silylating agent, wherein the silylating agent contains organosilicon groups which become incorporated in the surface region of the substrate; and oxidative stabilization of the surface of the substrate comprising oxidation of the organosilicon groups in at least an outer portion of the surface region, wherein the surface of the substrate after the oxidative stabilization comprises C, O and Si, with Si content at the surface being from about 20 atom percent to about 40 atom percent.

In another aspect, the invention provides a process for modification of a surface of a solid substrate selected from the group comprising organic polymers, metallized polymer films, graphite and carbon fiber reinforced composite materials, the substrate prior to modification being substantially unreactive with a silylating agent, the process comprising: surface activation of the solid substrate comprising formation of reactive hydrogen groups in a surface region of the substrate, wherein the reactive hydrogen groups are selected from one or more members of the group comprising OH, OOH and COOH groups; silylation of at least a portion of the reactive hydrogen groups in the surface region of the substrate with the silylating agent, wherein the silylating agent contains organosilicon groups which become incorporated in the surface region of the substrate; and oxidative stabilization of the organosilicon groups in at least an outer portion of the surface region, the outer portion having an erosion yield on the order of or less than about $10^{-26}$ g/atom of atomic oxygen when the surface of the substrate is exposed to the atomic oxygen having a kinetic energy of from about 1 eV to about 5.3 eV.

In a preferred aspect of the present invention, the dose of ultraviolet radiation in the initial activation step is from about 2 J/cm$^2$ to about 5 J/cm$^2$, the ultraviolet radiation having a wavelength of from about 185 nm to about 254 nm.

In another preferred aspect of the present invention, the oxidative stabilization is selected from the group comprising irradiation of the surface of the substrate with ultraviolet radiation in the presence of oxygen, corona discharge, and bombardment of the surface of the substrate with fast atomic oxygen or oxygen plasma.

In yet another preferred aspect of the present invention, the oxidative stabilization comprises irradiation of the surface of the substrate with a dose of from about 7 J/cm$^2$ to about 30 J/cm$^2$ of ultraviolet radiation in the presence of oxygen, the ultraviolet radiation in the oxidative stabilization having a wavelength of from about 185 nm to about 254 nm.

In yet another preferred aspect of the present invention, the dose of ultraviolet radiation in the oxidative stabilization is about 14 J/cm$^2$.

In yet another preferred aspect of the present invention, the surface of the substrate after the oxidative stabilization comprises about $10^{-25}$ atom percent C, about 40–60 atom percent O, and about 20–40 atom percent Si.

In yet another preferred aspect of the present invention, the substrate is selected from the group comprising: an organic polymer selected from the group comprising polyolefins, polyurethanes, polysiloxanes, halogenated polyolefins, polyesters, polyimides, polyamides and polyethers; composite materials comprising graphite fibers in a polymeric resin matrix; a metallized polymer film comprising an aluminized film of polyimide; and graphite fibers produced from polyacrylonitrile.

In yet another preferred aspect of the present invention, the substrate is an organic polymer selected from the group comprising polyethylene, poly(vinyl chloride), poly (ethylene terephthalate), poly(ether ether)ketone, and polyimides.

In yet another preferred aspect of the present invention, after the modification, the surface region has a thickness of from about 200 nm to about 1000 nm.

In yet another preferred aspect of the present invention, the surface activation is selected from the group comprising irradiation of the surface of the substrate with ultraviolet radiation in the presence of oxygen, and corona discharge.

BRIEF DESCRIPTION OF THE DRAWINGS

Further aspects and advantages of the present invention will be apparent from the following description taken together with the accompanying drawings in which.

DETAILED DESCRIPTION OF THE PREFERRED EMBODIMENTS

Figure 1:
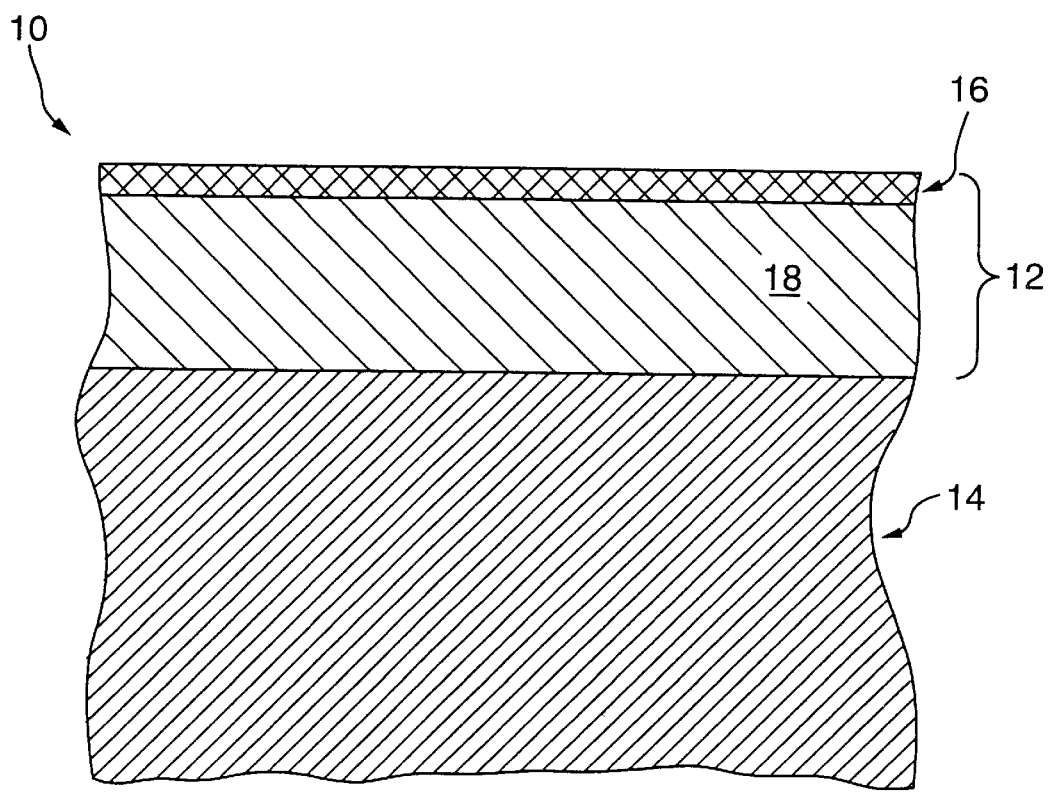
FIG. 1 is a sectional, side elevation schematic view showing the structure of a preferred surface-modified material according to the present invention.

FIG. 1 schematically illustrates a surface modified substrate 10 produced by a preferred process of the present invention. Substrate 10 is shown as having a silylated surface region 12 and underlying unmodified bulk substrate 14. Surface region 12 is produced according to the present invention by a first surface activation step wherein reactive hydrogen groups are produced in surface region 12, which is then silylated to replace hydrogen in at least a portion of the reactive hydrogen groups in surface region 12 of substrate 10 to silicon-containing groups. For convenience, FIG. 1 shows surface region 12 and bulk substrate 14 being separated by a sharp interface. However, it is to be understood that the transition between surface region 12 and bulk substrate 14 is graded and no identifiable interface exists. Further, it is to be appreciated that the distribution of the reactive hydrogen groups in the surface region 12 after the surface activation step, as well as the distribution of the silicon-containing groups in the surface region after silylation, is graded such that the concentration of such groups is highest at the surface of the substrate and gradually decreases inward of the surface of the substrate.

According to a preferred process of the present invention, a third oxidative stabilization step converts at least an outer portion 16 of silylated surface region 12 to a thin, silicon and oxygen enriched layer. Preferably, an inner portion 18 of silylated surface region 12 remains substantially unchanged after oxidative stabilization to provide surface modified material 10 with self-healing properties. For convenience, FIG. 1 shows a sharp interface between the silicon and oxygen enriched outer portion 16 and the inner portion 18 comprising silylated substrate, which together make up surface region 12. However, it is to be understood that the transition between portions 16 and 18 is graded and no identifiable interface exists.

Furthermore, it is to be understood that the silicon and oxygen content of the outer portion 16 of surface region 12 is highest at the surface of the substrate and gradually decreases inward of the surface.

It is also to be understood that the entire silylated surface region 12 may be oxidatively stabilized such that substantially the entire surface region 12 is converted to a silicon and oxygen enriched layer. In such a case, a graded transition exists between silicon and oxygen enriched surface region 12 and the underlying bulk substrate 14.

The process of the present invention can be used for surface modification of a wide variety of substrates for a wide variety of uses, preferably those which are substantially unreactive with silylating agents. Such substrates preferably include organic polymers, metallized polymer films, graphite, carbon fiber reinforced composite materials, polymer-based coatings on metal substrates and polymer-based textile materials.

Preferred polymers are those which do not have reactive hydrogen groups or reactive hydrogen precursor groups. Preferred polymers include polyolefins, polyacrylates, polyurethanes, polysiloxanes, polyamides, polyimides, halogenated polyolefins, polyesters and polyethers. More preferred organic polymers are those selected from the group comprising polyethylene, poly(vinyl chloride), poly(ethylene terephthalate), poly(ether ether)ketone, and polyimides.

Preferably, metallized polymer films comprise an aluminized film of polyimide, most preferably Kapton. Preferred composite materials include those containing carbon/graphite fibers in a polymeric resin or carbon matrix. The carbon/graphite fibers that reinforce the above composites can also be protected by this technique. Although, strictly speaking, these fibers are not polymeric materials, they are typically derived from polymeric materials such as polyacrylonitrile, and for convenience are sometimes referred to throughout this application as polymers or polymeric materials.

For space applications, the most preferred polymers which may be modified according to the present invention include polyimides, such as PMDA-ODA polyimide sold under the trade mark Kapton by Du Pont and having the repeating unit shown below, and aluminized Kapton; poly(ether ether ketone) such as that known as PEEK having the repeating unit shown below, and advanced composite materials, such as those comprising carbon fibers bonded with resin such as epoxy resins, carbon fibers in a PEEK matrix, and carbon fibers produced from poly(acrylonitrile) (PAN) precursor material.

A preferred process according to the present invention for surface modification of solid substrates is discussed below. The preferred process is divided into three distinct steps: activation, silylation and oxidative stabilization. These steps are discussed in detail below in the order in which they are performed.

Preferably, substrates are cleaned prior to the surface modification process to remove surface contaminants. Cleaning may preferably be performed in an ultrasonic bath of ethanol followed by oven drying in air at 50 to 100° C., depending on the substrate. However, it is to be understood that cleaning is not an essential step in the process of the present invention.

1. Surface Activation of Substrates

Surface activation comprises formation of reactive hydrogen groups in a surface region of the substrate, wherein the reactive hydrogen groups are selected from one or more members of the group comprising OH, OOH and COOH groups.

A preferred surface activation step of the present invention comprises formation of reactive hydrogen groups in a surface region of a solid substrate by photo-oxidation, which preferably comprises irradiation of the surface of the substrate with a dose of UV radiation, in the presence of oxygen.

UV radiation comprises radiation in the region of the electromagnetic spectrum including wavelengths from about 100 to about 380 nm. The preferred wavelengths to which substrates are exposed in the activation step is variable, and depends on the composition of the specific substrate. For example, polyimides such as Kapton are preferably irradiated with UV radiation having wavelengths from about 200 to about 300 nm. Kapton itself is preferably irradiated at wavelengths of 185 and 254 nm, primarily 254 nm.

Preferably, the source of UV radiation is a low-pressure quartz-mercury lamp having an intensity of from about 1 to about 5 mW/cm². Taking Kapton as an example, a particularly preferred intensity is about 2.8 mW/cm². Preferably, the molecular oxygen may be supplied as pure oxygen,

KAPTON

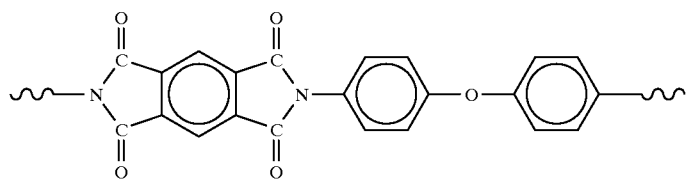

PEEK

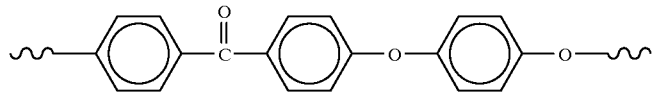

For packaging applications, preferred materials for surface modification according to the present invention include polyethylene (PE), poly(ethylene terephthalate) (PET), poly(vinyl chloride) (PVC), polypropylene (PP), oriented polypropylene (OPP), polystyrene and polyamides. The most preferred packaging materials which can be modified according to the present invention include PE, PET and PVC.

Other preferred polymers which may be modified according to the present invention include poly(methyl methacrylate) (PMMA) and polymeric biomaterials such as polyurethanes used in medical devices such as catheters, artificial heart valves and endotracheal tubes.

oxygen combined with other gases, or air, with air being preferred for simplicity.

The duration of the UV exposure is preferably from about 1 minute to about 120 minutes, more preferably from about 2 to about 20 minutes. The preferred UV dose is from about 0.7 J/cm² to about 5 J/cm², more preferably from about 2 to about 5 J/cm², depending on the substrate and the amount of functionalization desired. These parameters are preferred for production of reactive hydrogen groups. Irradiation for longer times and/or at higher intensities (as in Zelez) results in a decrease in the amount of active hydrogen groups and an increase in the amount of other oxygen-containing groups such as (ketone) carbonyl groups.

The activation of the substrate in the presence of UV radiation is believed to be a result of simultaneous excitement of molecules comprising the substrate and attack by molecular oxygen, as well as ozone, atomic oxygen and singlet oxygen generated from molecular oxygen by UV radiation.

The surface of the substrate is preferably kept at a distance of from about 5 to about 25 mm from the UV source, the concentrations of ozone, atomic oxygen and singlet oxygen being higher closer to the source of UV radiation.

The most probable mechanism for photo-oxidation of Kapton involves the excitation of the phthalimide chromophore with ultraviolet light of wavelengths between about 200–300 nm to form a biradical intermediate. It is very likely that this intermediate rapidly reacts with oxygen to form peroxy radicals (ROO.) which also abstract hydrogen atoms to form peroxides (ROOH). The peroxides can easily decompose to alkoxy (RO.) and hydroxy (.OH) radicals which can subsequently react via similar reactions.

As a result of the photochemically-induced oxidative surface modification, oxygen-containing reactive hydrogen groups such as OH, OOH and COOH are formed on the surface of the substrate. Preferably, surface activation of the substrate occurs to a depth of about 200 to about 1000 nm below the surface of the substrate, producing a surface region of the substrate containing active hydrogen groups.

It is possible to monitor the progress of the surface activation reaction by measuring the water contact angle of the substrate surface at different times during the activation step. FIGS. 2 to 5 are plots of water contact angle versus time of activation for Kapton, Mylar (PET), PVC and PE, respectively. The water contact angle decreases due to the increased hydrophilicity of the polymer surfaces.

Figure 2:
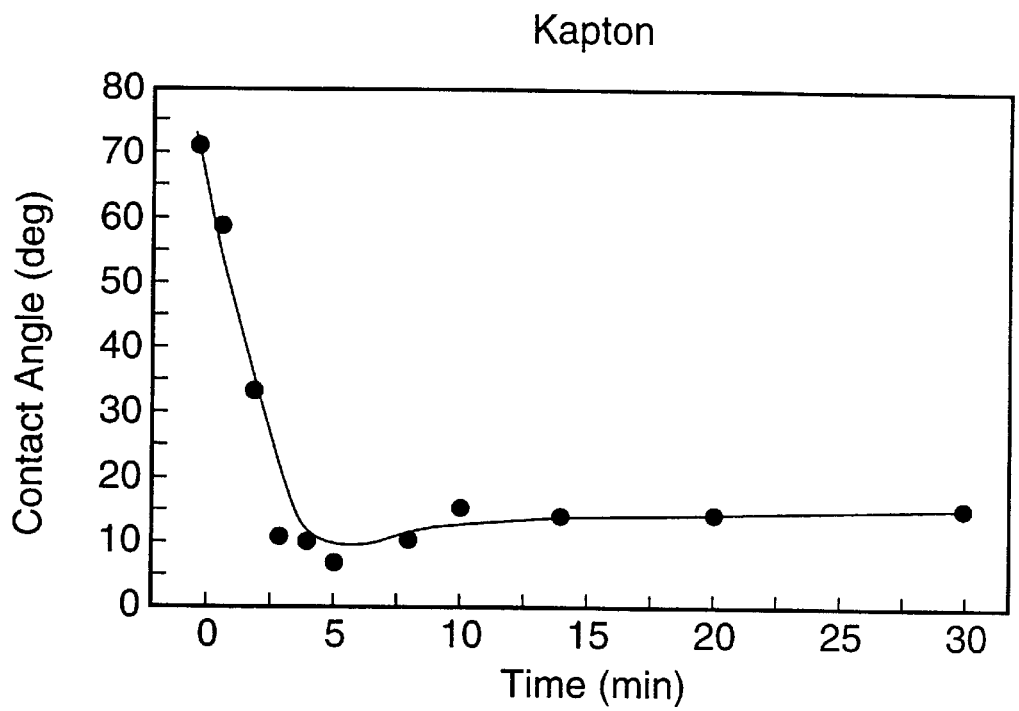
FIG. 2 is a graph of water contact angle versus time for the activation of Kapton.
Figure 3:
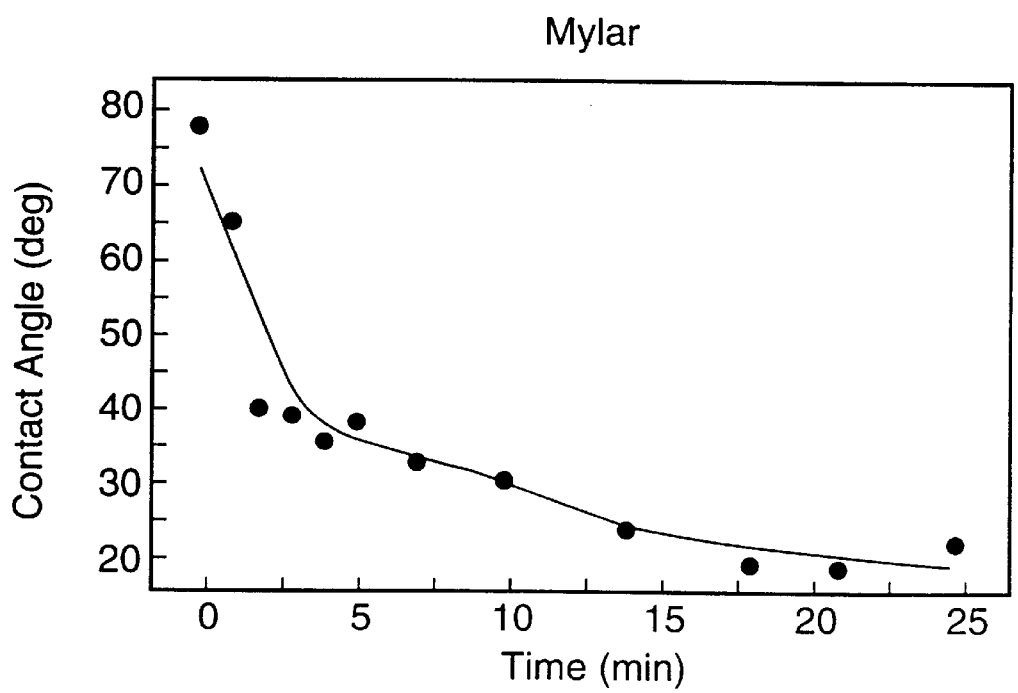
FIG. 3 is a graph of water contact angle versus time for the activation of Mylar.
Figure 4:
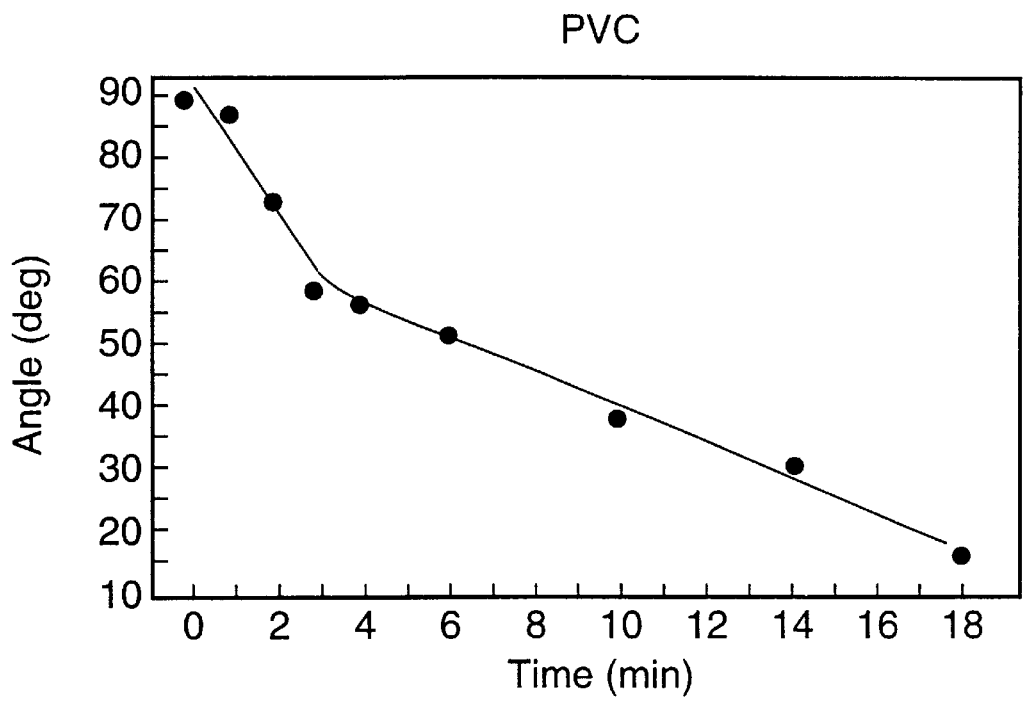
FIG. 4 is a graph of water contact angle versus time for the activation of PVC.
Figure 5:
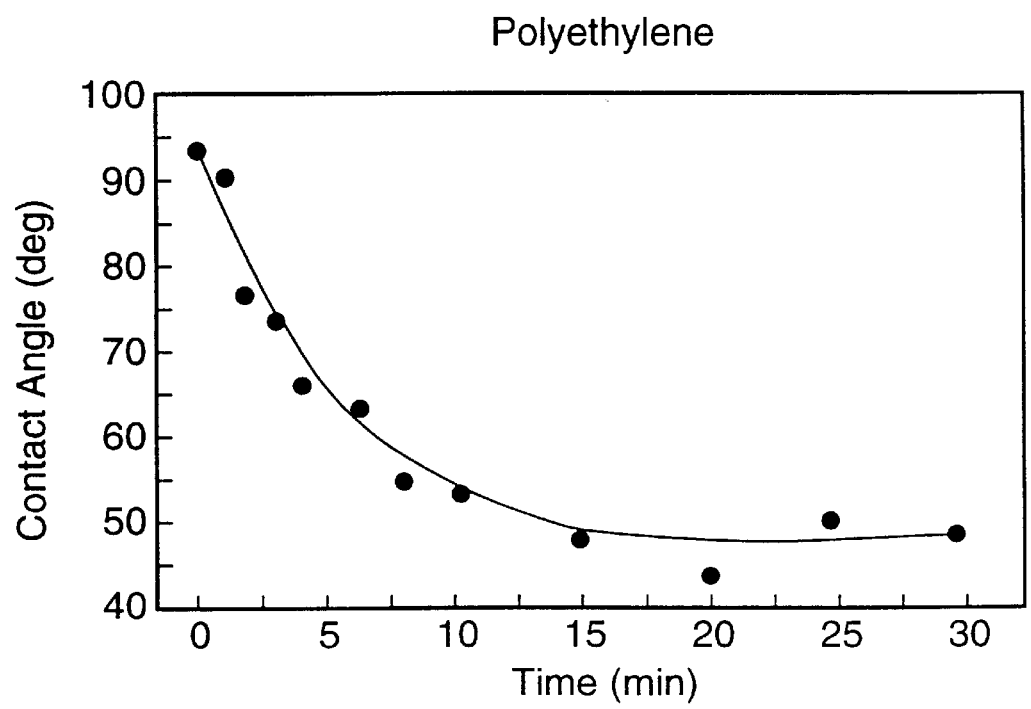
FIG. 5 is a graph of water contact angle versus time for the activation of polyethylene.

FIG. 2 shows the water contact angle of Kapton as a function of activation time. In a comparison between activation done in air and pure oxygen, no visible dependence on oxygen concentration was observed for activation of Kapton. For short (about 3 to 5 minutes) treatments a relatively high, constant rate reaction is occurring, reducing the water contact angle from 72° to about 10°. For longer treatment times, the surface comes to a steady state with the same contact angle. It is important to note that the water contact angles were measured immediately after the treatment. For samples stored in air after treatment the contact angles increased to about 50°. It is also important to note that, even though the water contact angle reaches a steady state, the surface composition continues to change throughout the activation step. The inventors have found that shorter treatment times result in high concentrations of reactive hydrogen groups, whereas longer treatment times result in the formation of other oxygen-containing groups, such as (ketone) carbonyl groups.

The following Table I compares compositions of Kapton polyimide, as determined by X-ray Photospectroscopy (XPS), with the theoretical composition.

TABLE I

Sample composition of Kapton Polyimide as determined by XPS

| Sample and Treatment | Composition, at % | | | |
|---|---|---|---|---|
| | Carbon | Oxygen | Nitrogen | O/C |
| Theoretical Polyimide Control: | 75.9 | 17.2 | 6.9 | 0.23 |
| Surface | 79.6 | 14.3 | 5.4 | 0.18 |

TABLE I-continued

Sample composition of Kapton Polyimide as determined by XPS

| Sample and Treatment | Composition, at % | | | |
|---|---|---|---|---|
| | Carbon | Oxygen | Nitrogen | O/C |
| "Bulk" | 79.9 | 14.4 | 5.8 | 0.18 |
| Exposure UV in air | 75.0 | 19.0 | 6.5 | 0.25 |
| Wet Process | 77.0 | 15.0 | 6.2 | 0.19 |

Table I shows that the ratio of O/C atoms in Kapton increased by a factor of 1.4 following activation. Although not shown in Table I, high resolution XPS indicates that phenolic hydroxyl groups have been formed on the surface of Kapton during the activation.

The surface photo-oxidation of PEEK is preferably carried out under UV irradiation at wavelengths greater than 290 nm. It is evident from the structure of this polymer shown above that it contains a benzophenone unit which absorbs strongly at 350 nm. Consequently, considerable reactivity to UV irradiation is expected. It was found that after a one hour exposure of PEEK to UV nearly 60% of the carbon atoms in the surface were bonded to oxygen. To explain such levels of oxidation, the carbon atoms in the phenyl rings have to be involved. This would suggest that photo-oxidation results in the oxidative attack of the phenyl moiety, via ring opening reactions as opposed to extensive main chain cleavage.

A comparison of theoretical composition of PEEK with that measured by XPS before and after activation is shown in Table II below. As in the case of Kapton, activation causes an increase in the O/C ratio, the ratio increasing by 2.5 times after activation.

TABLE II

Sample composition of PEEK as determined by XPS

| Sample and Treatment | Composition, at % | | | | |
|---|---|---|---|---|---|
| | Carbon | Oxygen | Nitrogen | Others | O/C |
| Theoretical PEEK | 86.4 | 13.6 | — | — | 0.16 |
| Control surface | 85.6 | 12.7 | — | 1.7 | 0.15 |
| Exposure UV in air | 68.0 | 26.0 | 1.3 | 4.7 | 0.38 |

To increase the rate of activation, it may be preferred in some cases to generate and add ozone to the reaction chamber, particularly in cases where the reaction rate is dependent on the concentration of ozone.

Figure 6:
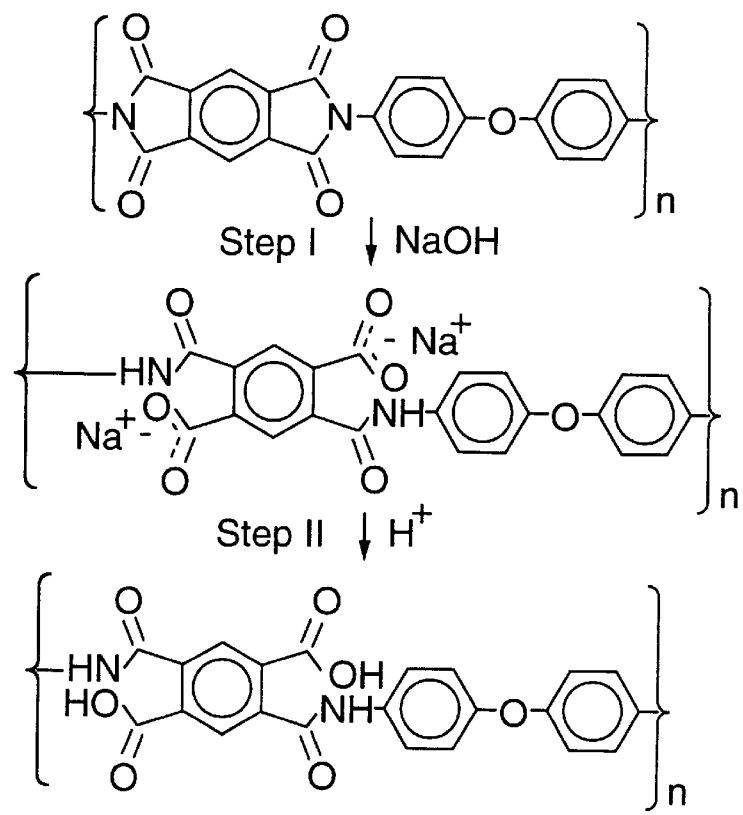
FIG. 6 is a reaction sequence showing the wet process for activation of Kapton.

As discussed above, some polymers, for example polyimides, may be activated by a wet process, comprising hydrolysis by a dilute aqueous base, such as NaOH, followed by proton exchange with an acid such as acetic acid. A reaction scheme for wet activation of Kapton is shown in FIG. 6. Hydrolysis and acidification of the polyimide occurs by ring-opening of the imide to form the corresponding carboxylic acid and amide (polyamic acid).

Preferably, the base hydrolysis of Kapton is performed in aqueous 0.25 M NaOH at room temperature for about three hours. The polyamic acid salt is preferably then treated with 0.1 M acetic acid for about three hours at room temperature.

Although the surface activation substrates has been described above with reference to oxidative activation by molecular oxygen and UV and a wet process for polyimides, it is to be understood that other processes may be used to activate the surface of a solid substrate. For example, dry processes such as oxidation in oxygen containing plasmas, oxygen ion-beam modification, oxidation by fast atomic oxygen (FAO), and corona discharge may be used to produce reactive hydrogen groups on the surface of a solid substrate.

2. Silylation

The silylation step of the process of the present invention comprises reaction of at least some of the reactive hydrogen groups, formed in the upper region of the substrate by the surface activation step, with a silylating agent, whereby silicon-containing groups of the silylating agent become chemically bonded to polymer molecules in the surface region of the substrate.

The silylation step according to the present invention may preferably be carried out as a vapor phase or liquid phase reaction, preferably using a silylating agent containing organosilicon groups and selected from the group comprising monofunctional and polyfunctional silylating agents.

Preferred monofunctional silylating agents include dimethylsilyldimethyl amine (DMSDMA), 1,1,3,3-tetramethyl disilazane (TMDS), N,N-dimethylamino trimethylsilane (TMSDMA), N,N-diethylaminotrimethylsilane (TMSDEA) and hexamethyldisilazane (HMDS). In these monofunctional silylating agents, each silicon atom is bonded to one nitrogen atom. During the silylation reaction the Si—N bonds are broken, and each silicon atom forms one bond with the surface of the substrate. The structures of these monofunctional silylating agents are as follows:

*Monofunctional Silylating Agents*

1. Dimethylsilyldimethyl amine (DMSDMA)

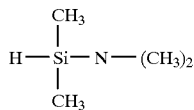

2. 1, 1, 3, 3-Tetramethyl disilazane (TMDS)

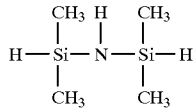

3. N, N-Dimethylamino-trimethylsilane (TMSDMA)

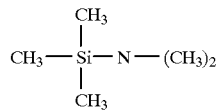

4. N, N-Diethylaminotrimethylsilane (TMSDEA)

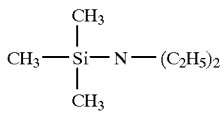

5. Hexamethyl-disilazane (HMDS)

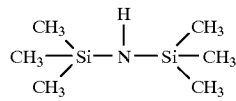

Preferred polyfunctional silylating agents include Bis (dimethylamino) methylsilane (B[DNA]MS), Bis-(dimethylamino) dimethylsilane (B[DMA]DS) and 1,1,3,3, 5,5-hexamethylcyclotrisilazane (HMCTS). In each of these polyfunctional sylylating agents, each silicon atom is bonded to two nitrogen atoms. When the Si—N bonds are broken, each silicon atom forms two bonds with the polymer molecules of the substrate, resulting in cross-linking of the polymer molecules in the surface region of the substrate. The structures of the preferred polyfunctional silylating agents are as follows:

*Polyfunctional Silylating Agents*

1. Bis (dimethylamino) methylsilane (B[DMA]MS)

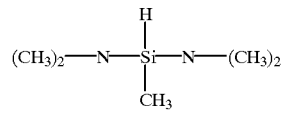

2. Bis (dimethylamino) dimethylsilane (B[DMA]DS)

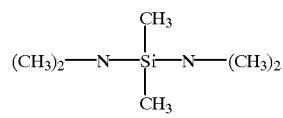

3. 1, 1, 3, 3, 5, 5-Hexamethylcyclotrisilazane (HMCTS)

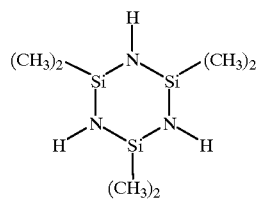

Gas phase silylation is preferably carried out in a vapor of silylating agent, most preferably HMDS, in a nitrogen carrier gas at elevated temperatures, preferably in the range of about 140 to 200° C.

In the process of the present invention, liquid-phase silylation is preferred over gas-phase silylation. Liquid-phase silylation has a number of advantages over gas-phase silylation, such as easy applicability to industrial processes, higher silicon incorporation rates (up to about 25 wt %) and the ability to carry out liquid phase silylation using simple equipment at low temperatures, preferably in the range of from about 20 to about 60° C. However, it is to be appreciated that gas-phase silylation may be preferred when the surface modification is conducted on an industrial scale.

The liquid phase silylation solution is comprised of two and possibly three components: 1) the silylating agent, 2) the transport solvent, and possibly, 3) a diffusion enhancer. The silylating agent is, as previously outlined, the chemical agent that carries the necessary silicon. The transport solvent acts as the solvent for the silylating agent, and should be relatively inert otherwise. The diffusion enhancer is a solvent that dissolves the surface of the substrate slightly, allowing the silylating agent to diffuse deeper and more rapidly below the surface of the substrate, preferably throughout the entire surface region containing reactive hydrogen groups.

The preferred silylating agents for liquid phase silylation are the polyfunctional silylating agents HMCTS and B[DMA]DS. Due to the size of HMCTS, Si incorporation rates are lower with HMCTS than with B[DMA]DS and therefore B[DMA]DS is preferred over HMCTS. It is believed that polyfunctional silylating agents form a polysiloxane (Si—O—Si) chain on each reactive hydrogen group resulting in a higher silicon incorporation rate.

Preferred transport solvents are those which act as a solvent for the silylating agent, and are inert toward the substrate, that is, they do not dissolve or swell the substrate. The most preferred solvents are hydrocarbons, with aromatic solvents such as xylene, and aliphatic solvents such as n-decane being particularly preferred.

Preferably, the silylating agent diffuses into the substrate to react with active hydrogen atoms throughout the activated surface region of the substrate. The diffusion rate of the silylating agent may preferably be increased by slight heating, up to about 60° C., and by the addition, to the silylation bath, of the diffusion enhancer. For polymers such as Kapton, PEEK and PET a diffusion enhancer such as n-methylpyrrolidone (NMP) can be added. It should be noted that the diffusion enhancer is not necessary to the process, it simply acts as an aid to increase the depth and speed of the silylation process.

Most preferably, silylation is carried out at 50–60° C., the substrate being immersed in a solution of silylating agent for about 3 to 20 minutes.

3. Oxidative Stabilization

Oxidative stabilization is preferably performed after the silylation step in order to form a protective silicon and oxygen enriched outer portion in the surface region of the modified substrate. The oxidative stabilization comprises oxidation of an outer portion of the surface region, such that the polymer molecules in the outer portion of the substrate become oxidatively converted to stable structures enriched with silicon and oxygen.

Oxidative stabilization may be performed by a number of methods. Preferred methods include bombarding the surface with FAO or an oxygen plasma, by exposure to UV radiation in the presence of oxygen, and corona discharge. Oxidative stabilization by exposure to FAO may preferably be conducted either in an atomic oxygen beam facility or in a LEO space environment. Therefore, substrates treated by the activation and silylation steps described above may either be oxidatively converted in use through exposure to FAO in the LEO space environment or before use in an atomic oxygen beam facility.

The most preferred method of oxidative stabilization according to the present invention is through exposure of the surface of the silylated substrate to UV radiation in the presence of oxygen. Oxidative stabilization by UV/oxygen may preferably be performed in an identical manner to the activation step described above, and may be performed in air under a source of UV radiation. This method of oxidative stabilization is preferred because it uses easily obtained, relatively inexpensive equipment.

All of the preferred oxidative stabilization methods form a newly developed polymer structure containing different types of bonds between Si, C and O, which stops the destruction of the polymer matrix in different oxidizing environments. These structures include atoms coming partially from the silylating agent and partially from molecules of the pristine (bulk) substrate. This is supported by the experimental results shown in Tables IV and VI, which summarize the chemical content of samples treated by the process of the invention and the nature of the bonds in the newly formed structure after the final, oxidative stabilization step. Active oxygen species include molecular oxygen, ozone, atomic oxygen, singlet oxygen, all of which are present in $UV/O_2$ stabilization; atomic oxygen in the case of FAO conversion; and oxygen ions in oxidative stabilization by oxygen plasma.

In a preferred oxidative stabilization step, the substrate is exposed to a combination of oxygen and UV radiation in the 254 and 185 nm range, predominantly 254 nm, in the presence of air. The substrate is preferably placed up to about 25 mm from the UV source, the UV dose preferably being from about 7 $J/cm^2$ to about 30 $J/cm^2$, and more preferably about 14 $J/cm^2$. The preferred length of the oxidative stabilization process is about 20 to 120 minutes, depending on the intensity of the UV source. However, it is to be appreciated that for some applications, particularly non-space related applications, oxidative stabilization for a few minutes, or less than one minute, may be sufficient.

Preferably, the depth of the silicon and oxygen enriched outer portion of the surface region formed by the oxidative stabilization is estimated to be about 2 to about 200 nm thick and is typically only a small fraction of the thickness of the silylated surface region, which is estimated to be about 200 to 1000 nm. However, it is to be appreciated that the oxidative stabilization may affect all, or a substantial portion, of the silylated surface region.

Before the oxidative stabilization, the silylated substrate may be annealed by heating. In a preferred annealing step, the silylated substrate is baked in a hot oven at a maximum temperature of about 60 to about 100° C.

Analysis of annealed samples by XPS shows an increase in the number of Si—O bonds and an increase in the Si/C ratio, while also showing a decrease in the number of Si—N bonds. Therefore, it appears that annealing results in partial oxidation of the surface with some formation of $SiO_2$. Although, when a final oxidative stabilization step is performed, annealing is unnecessary, it is to be understood that annealing may be preferred in some circumstances. Whether or not the silylated substrate has been annealed, the final oxidative stabilization step results in a sharp increase in silicon and oxygen content of the outer portion of the surface region with a decrease in carbon content and total disappearance of nitrogen. This is due to conversion of organosilyl groups to silicon dioxide in the outer portion of the surface region of the silylated substrate.

The silicon and oxygen enriched outer portion of the surface region is a transparent and glass-like. It was found that surface modified Kapton had very similar optical properties as pristine samples, in particular total reflectance (200 to 2450 nm), which covers UV, visible and infrared radiation, was unchanged.

Experimental

The following examples 1 to 16, in conjunction with FIGS. 2 to 5, illustrate the results of surface modification processes according to the present invention on various types of polymers.

The materials used in Examples 1 to 16 were as follows:

Kapton 500 HN (PMDA-ODA) polyimide sheets with a thickness of 125 µm (5 mil) were obtained from Du Pont.

Aluminized Kapton (Al-Kapton) Polyimide (PMDA-ODA) sheets with a thickness of 76.2 µm (3 mil) aluminized (0.1 µm) on one side, was purchased from Du Pont.

PEEK [poly(ether ether ketone)], 250 µm thick, was obtained from ICI.

Mylar [poly(ethylene terephthalate)] sheets with a thickness of 1.0 mil were obtained from Du Pont.

PE [polyethylene]—linear-low-density poly(ethylene) sheets with a thickness of 1 to 5 mil were obtained from Du Pont.

PVC [poly(vinyl chloride)] sheets with a thickness of 4 mil were obtained from Commercial Plastics and Supply Co.

AS4/APC-2, 4-ply, carbon fiber/PEEK matrix composite sheets were manufactured from prepreg material supplied by Fiberite.

AS4/3501-6, 4-ply, carbon fiber/epoxy matrix composite sheets were manufactured from prepreg material supplied by Hercules.

Magnamite AS4 PAN based carbon fiber in a mat form was obtained from Hercules.

Example 1

As-received Kapton 5 mil thickness film, measuring 5×5 cm was placed 25 mm from UV source in air and was exposed 20 min to a total dose of 3±0.1 J/cm² on both sides. After activation the sample had: water contact angle 20°, composition of surface by XPS: C-74.5; O-19.0; N-6.5% at. (XPS analyzes the outer most 1 to 2 nm of a surface and provides quantitative measurements of all chemical elements except hydrogen. XPS is also sensitive to bonding type.)

The film was then silylated in a solution of 31% B[DMA] DS in p-xylene containing 7% NMP for about 10 min at 55° C. in a beaker heated on a hot plate. The film was then washed in p-xylene, blown dry with air at room temperature. After silylation the sample had: water contact angle 90°, composition of surface C-64.8; O-16.0; N-5.2; Si-14% at. Next, the silylated film was placed 25 mm from the UV source in air and exposed to a total dose of 14.0±0.5 J/cm². After oxidative stabilization the sample had: water contact angle 4°; composition of surface C-17; O-49; N-0; Si-34% at.

The results from SIMS depth profile analysis indicates that the penetration of Si into the Kapton exceeds 0.5 μm. Based upon both Si and 18O distributions in the subsurface layer it is obvious that an oxide-based layer, with a thickness of 1000 to 1500 Å and a graded distribution of these elements, is formed in the material.

Example 2

Example 1 was repeated, except that the Kapton film was cleaned ultrasonically for 10 min in a solution of ethanol and dried in an oven at 100° C. for 60 min. After oxidative stabilization the sample had: water contact angle 0°, composition of surface C-18; O-48; N-3; Si-31% at.

Example 3

Example 2 was repeated, except that the film measuring 15×15 cm was silylated in a solution of 15% B[DMS]DS in p-xylene containing 8.5% NMP in an oven for 15 min at 59° C., washed in p-xylene and dried in the oven at 100±5° C. for about 60 min. After oxidative stabilization the sample had: water contact angle 0°, composition of surface C-27; O-45; N-1; Si-27% at.

Example 4

As received aluminized Kapton, measuring 5×5 cm, was placed 25 mm from UV source in air and exposed for 20 min to a total dose of 3±0.1 J/cm². After activation the sample had water contact angle 20°. The film was then silylated in a solution of 31% B[DMA]DS in p-xylene containing 7% NMP for about 10 min at 55° C. in a beaker heated on a hot plate. The film was then washed in p-xylene, blown dry with air at room temperature. After silylation the sample had a water contact angle of 92°. Next, the film was placed 25 mm from the UV source in air atmosphere and was exposed to a total dose of 14.0±0.5 J/cm². After oxidative stabilization the sample had: water contact angle 0°, composition of surface C-24; O-52; N-1.6; Si-22% at.

Example 5

Example 4 was repeated except that, before activation, the Al-Kapton film was cleaned ultrasonically for 10 min in a solution of ethanol and oven dried at 100° C. for 60 minutes. After oxidative stabilization the sample had; water contact angle 0°, surface composition C-26; O-54; N-0; Si-20% at.

Example 6

Example 5 was repeated, except that the film measuring 15×15 cm was silylated in a solution of 15% B[DMS]DS in p-xylene containing 8.5% NMP, in an oven for 15 min at 59° C., washed in p-xylene and oven dried at 100±5° C. for about 60 min. After oxidative stabilization the sample had: water contact angle 0°, surface composition C-57; O-20; N-0; Si-23% at.

Example 7

As received PEEK, measuring 5×5 cm, was placed 25 mm from UV source in air and exposed for 20 min to a total dose of 3±0.1 J/cm². After activation the sample had: water contact angle 22°, surface composition C-68; O-26; other-5.7% at.

The film was then silylated in a solution of 31% B[DMA] DS in p-xylene containing 7% NMP for about 10 min at 55° C. in a beaker heated on a hot plate. The film was then washed in p-xylene, blown dry with air at room temperature. After silylation the sample had: water contact angle 133°, the composition of the surface being C-73; O-17; Si-10% at.

Next, the film was oxidatively converted 25 mm from the UV source in air and exposed to a total dose of 14.0±0.5 J/cm². After oxidative stabilization the sample had: water contact angle 0°, surface composition C-26; O-48; Si-26% at.

Example 8

As-received Mylar 1.0 mil thickness film, measuring 5×5 cm was placed 25 mm from UV source in air and exposed 4 min to a total dose of 0.7±0.05 J/cm² on both sides. After activation the sample had water contact angle 370. The film was then silylated in solution of 15% B[DMS]DS in p-xylene containing 8.5% NMP in an oven for 15 min at 50° C., washed in p-xylene and oven dried at 70° C. for about 60 min. After silylation the sample had water contact angle 101°, surface composition C-47.6; O-25.1; Si-26.8% at. Next, the film was placed 25 mm from the UV source in air and exposed to a total dose of 7.0 J/cm². After oxidative stabilization the sample had: water contact angle 0°, surface composition C-28.4; O-47.5; Si-23.6% at.

Example 9

Example 8 was repeated, except that the Mylar film was activated 15 min to a total dose of 2.5 J/cm². After activation the sample had water contact angle 25°. The film was then silylated for 10 min. After silylation the sample had a water contact angle of 101°, surface composition C-50.6; O-25.6; Si-23.5% at. After oxidative stabilization the sample had: water contact angle 9°, surface composition C-27.2; O-48.1; Si-24.3% at.

Example 10

As-received Mylar 1.0 mil thickness film, measuring 5×5 cm was cleaned ultrasonically for 10 min in a solution of ethanol and oven dried at 60° C. for about 60 min. The film then was placed 25 mm from UV source in air and exposed to a total dose of 3.0±0.1 J/cm² on both sides. After activation the sample had a water contact angle of 22°. The film was then silylated in solution of 15% B[DMS]DS in p-xylene containing 8.5% NMP in an oven for 15 min at 59° C., washed in p-xylene and oven dried at 60° C. for about 60 min. After silylation the sample had: water contact angle 106°; surface composition C-58; O-21; Si-20% at. Next, the film was placed 25 mm from the UV source in air and exposed to a total dose of 14.0 J/cm². After oxidative stabilization the sample had: water contact angle 18°; surface composition C-36.6; O- 43.1; Si-20.3% at.

Example 11

As-received Polyethylene 5 mil thickness film, measuring 5×5 cm was cleaned ultrasonically for 10 min in a solution of ethanol and oven dried at 55° C. for about 60 min. The film then was placed 5 mm from UV source in air and exposed to a total dose of 5.0 J/cm² on both sides. After activation the sample had a water contact angle of 33°. The film was then silylated in solution of 15% B[DMS]DS in p-xylene containing 8.5% NMP in an oven for 15 min at 55° C., washed in p-xylene and oven dried at 55° C. for about 60 min. After silylation the sample had: water contact angle 99°; surface composition C-68; O-16; Si-16% at. Next, the film was placed 10 mm from the UV source in air and exposed to a total dose of 14.0 J/cm². After oxidative stabilization the sample had: water contact angle 60°; surface composition C-41.1; O-39.3; Si-19.6% at.

Example 12

As-received PVC 4.0 mil thickness film, measuring 5×5 cm was placed 25 mm from UV source in air and exposed 3 min to a total dose of 0.5±0.01 J/cm² on both sides. After activation the sample had a water contact angle of 60°. The film was then silylated in solution of 15% B[DMS]DS in p-xylene in an oven for 2 min at 50° C., washed in p-xylene and oven dried at 60° C. for about 60 min. After silylation the sample had: water contact angle 105°, surface composition C-58.9; O-17.1; Si-13.8; Cl-10.1% at. Next, the film was placed 25 mm from the UV source in air and exposed to a total dose of 10.0 J/cm². After oxidative stabilization the sample had: water contact angle 19°; surface composition C-35.9; O-42.5; Si-19.7; Cl-1.1% at.

Example 13

Example 12 was repeated, except that the PVC film was activated for 15 min to a total dose of 2.5 J/cm². After activation the sample had water contact angle 22°. After silylation the sample had water contact angle of 105°, surface composition C-51.2; O-24.8; Si-22.8; Cl-0.6% at. After oxidative stabilization the sample had: water contact angle 0°, composition of surface C-30.8; O-47.0; Si-21.1; Cl-0% at.

Example 14

A carbon fiber/PEEK matrix composite sample was cleaned ultrasonically for 15 minutes in an ethanol solution, then oven dried for 60 minutes at 60° C. The sample was placed 25 mm from the UV source in air and exposed to a total dose of 3±0.3 J/cm on each side. After activation the water contact angle was 12°. Silylation was done using a solution of 30% B[DMA]DS in p-xylene containing 10% NMP at 60° C. for 10 minutes. The water contact angle after silylation was 79°. Oxidative stabilization was performed at 25 mm from the UV source in air with a total dose of 14.0±1.0 J/cm². After oxidative stabilization the sample had surface composition C-20.8; O-52.7; N-0.7; Si-25.6% at.

Example 15

A carbon fiber/epoxy matrix composite samples was cleaned ultrasonically for 15 minutes in an ethanol solution, then oven dried for 60 minutes at 60° C. The sample was placed 5 mm from the UV source in air and exposed to a total dose of 5±0.1 J/cm² on each side. After activation the water contact angle was 18°. Silylation was done using a solution of 30% B[DMA]DS in p-xylene containing 10% NMP at 60° C. for 10 minutes. The water contact angle after silylation was 85°. Oxidative stabilization was performed at 5 mm from the UV source in air and exposed to a total dose of 30.0±1.0 J/cm². After oxidative stabilization the sample had surface composition C-18.0; O-55.1; N-1.4; Si-25.4% at.

Example 16

PAN based carbon fiber in a mat form was ultrasonically cleaned for 15 minutes in an ethanol solution. Activation was performed in 2 steps: 2 minute sulphuric acid etch followed by UV irradiation at 5 mm from the UV source in air with a total dose of 5.0±0.1 J/cm² on both sides. Water contact angle was estimated at less than 30°. Silylation was done using a solution of 30% B[DMA]DS in p-xylene at 60° C. for 15 minutes. Water contact angle was estimated to be approximately 90°. Before oxidative stabilization the sample was oven dried for 1 hour at 60° C. Oxidative stabilization was done at 5 mm from the UV source in air for a total dose of 30.0±0.1 J/cm² on both sides. Water contact angle was estimated to be less than 30°. After oxidative stabilization the sample had surface composition C-46.9; O-27.5; N-0; Si-25.6% at.

Table III below shows the water contact angles for different polymer samples at different stages of the surface modification process according to the present invention.

TABLE III

A Summary of Water Contact Angle Values for Materials as Measured After Different Stages of the Modified Silylation Process, 20° C.

| | Water Contact Angle After Different Stages in the Process [deg] | | | |
|---|---|---|---|---|
| Polymer | Pristine (untreated) | Activated | Silylated | Oxidatively Converted |
| Kapton 500 HN | | | | |
| Example 1 | 72 | 21 | 90 | 4 |
| Example 2 | | 20 | 91 | 0 |
| Example 3 | | 22 | 89 | 0 |
| Al-Kapton | | | | |
| Example 4 | 85 | 21 | 92 | 0 |
| Example 5 | 85 | 20 | 93 | 0 |
| Example 6 | 85 | 22 | 93 | 0 |
| PEEK | | | | |
| Example 7 | 72 | 22 | 133 | 0 |
| Mylar | | | | |
| Example 8 | 77 | 37 | 101 | 0 |
| Example 9 | 77 | 25 | 101 | 9 |
| Example 10 | 77 | 22 | 106 | 18 |
| Polyethylene | | | | |
| Example 11 | 102 | 33 | 99 | 72 |
| PVC | | | | |
| Example 12 | 82 | 60 | 105 | 19 |
| Example 13 | 82 | 23 | 105 | 0 |
| AS4 Fiber | | | | |
| APC-2 PEEK Resin | 72 | 12 | 79 | 22 |
| 3501-6 Epoxy Resin | 79 | 18 | 85 | 12 |
| AS4 Fibers | ~90 | <30 | ~90 | <30 |

Although water contact angles vary according to the type of polymer, the general trend observed is that the water contact angle decreases after the activation step due to an increase in oxygen content. The water contact angles increase after silylation, with the silylated polymer surface becoming at least as hydrophobic as untreated material. Lastly, after oxidative stabilization, the water contact angles again decrease. Typically, the water contact angle of oxidatively converted samples is lower than that of samples after the initial activation step, and many of these oxidatively converted samples have water contact angles of 0°. This is indicative of a surface layer depleted in carbon and enriched in silicon dioxide, which is very hydrophilic.

Table IV summarizes the surface compositions, as determined by XPS, of samples treated above in Examples 1 to 16.

TABLE IV

Summary of X-ray Photospectroscopy (XPS) Analyses Based on Results Described in Examples 1–16

| Sample | After final stage of formation, (at. %) | | | |
|---|---|---|---|---|
| | C | O | Si | N |
| Kapton (example 1) | 17 | 49 | 34 | |
| Aluminized Kapton (example 4) | 24 | 52 | 22 | 1.6 |
| PEEK (example 7) | 26 | 48 | 26 | |
| Mylar (example 8) | 28.4 | 47.5 | 23.6 | |
| Polyethylene (example 11) | 41.1 | 39.3 | 19.6 | |
| PVC (example 13) | 30.8 | 47 | 21.1 | |
| Carbon fibre/PEEK (example 14) | 20.8 | 52.7 | 25.6 | 0.7 |
| Carbon fibre/Epoxy (example 15) | 18 | 55.1 | 25.4 | 1.4 |
| PAN based carbon fiber (example 16) | 46.9 | 27.5 | 25.6 | |

Table V below shows high resolution XPS data for several polymer samples treated by the process of the invention.

TABLE V

High Resolution XPS Data

| Peaks | Be, eV | Atomic % |
|---|---|---|
| Kapton | | |
| C 1s | 284.7 | 91.0 |
| | 286.0 | 9.0 |
| Si 2p | 101.9 | 35.3 |
| | 103.3 | 43.2 |
| | 104.0 | 21.6 |
| O 1s | 531.6 | 14.6 |
| | 532.8 | 85.4 |
| Al-Kapton | | |
| C 1s | 284.7 | 14.1 |
| | 286.1 | 51.9 |
| | 287.6 | 18.6 |
| | 289.7 | 10.4 |
| | 291.5 | 5.0 |
| Si 2p | 103.2 | 38.4 |
| | 104.7 | 41.1 |
| | 105.3 | 20.5 |
| O 1s | 532.7 | 36.8 |
| | 534.2 | 63.2 |
| PEEK composite | | |
| C 1s | 283.2 | 3.5 |
| | 284.7 | 59.1 |
| | 286.1 | 20.8 |
| | 287.2 | 7.8 |
| | 288.5 | 5.6 |
| | 289.5 | 3.1 |
| Si 2p | 102.6 | 27.9 |
| | 103.6 | 61.0 |
| | 104.7 | 11.1 |
| O 1s | 531.2 | 3.0 |
| | 533.0 | 93.4 |
| | 534.8 | 3.7 |

TABLE V-continued

High Resolution XPS Data

| Peaks | Be, eV | Atomic % |
|---|---|---|
| Epoxy composite | | |
| C 1s | 283.5 | 4.3 |
| | 284.8 | 69.0 |
| | 285.9 | 13.1 |
| | 287.4 | 6.4 |
| | 289.6 | 1.8 |
| | 292.2 | 5.1 |
| Si 2p | 102.4 | 22.2 |
| | 103.6 | 64.5 |
| | 104.7 | 13.3 |
| O 1s | 532.1 | 14.3 |
| | 533.1 | 66.5 |
| | 534.0 | 19.2 |

Table VI shows the surface composition, as determined by XPS, of various polymer samples after the silylation and oxidative stabilization steps of the process of the present invention. Table VI shows that generally, oxidative stabilization causes a decrease in the carbon content of the upper surface layer and a corresponding increase in the content of oxygen and silicon.

TABLE VI

XPS Surface Composition (atomic %) of Polymer Samples After Different Stages of Treatment

| Sample | Elements Detected | | | | |
|---|---|---|---|---|---|
| | C | O | N | Si | Other |
| Kapton | | | | | |
| Pristine | 79.6 | 14.3 | 5.4 | — | — |
| After silylation | 65 | 16 | 5.2 | 14 | — |
| After oxidative stabilization | 17 | 50 | — | 34 | — |
| Al-Kapton | | | | | |
| Pristine | 67.8 | 23.1 | 2.1 | 1.8 | 5.3 Al |
| After silylation | 57 | 20 | — | 23 | — |
| After oxidative stabilization | 38 | 39 | — | 23 | — |
| Mylar | | | | | |
| Pristine | 78 | 22 | — | — | 0.8 Sn |
| After silylation | 58 | 21 | — | 20 | 0.6 Sn |
| After oxidative stabilization | 36.6 | 43.4 | — | 20.3 | — |
| Polyethylene | | | | | |
| Pristine | 97 | 2.6 | — | — | 0.7 Sn |
| After silylation | 68 | 16 | — | 16 | — |
| After oxidative stabilization | 41.1 | 39.3 | — | 19.6 | — |
| PVC | | | | | |
| After silylation | 51.2 | 24.8 | — | 22.8 | 0.6 Cl |
| After oxidative stabilization | 30.8 | 47.0 | — | 21.1 | — |

Atomic Oxygen Testing

The polymer samples, treated as discussed above in Examples 1 to 16, were tested in an atomic oxygen beam facility in order to determine their overall resistance to highly oxidizing environments.

The samples comprised 1.2 cm diameter discs. Each sample was held about its edges in a holder such that a 1.0 cm diameter area was exposed and the outer edge of the disc was masked by the holder. Each test sample was exposed to FAO at an average flux of $1 \times 10^{16}$ atoms/cm$^2$, for a period of 6 hours at a constant temperature, to provide a fluence of about $2 \times 10^{20}$ atoms/cm$^2$, typical of fluences encountered in space missions.

The mass of each test sample was measured following exposure and the mass loss due to atomic oxygen erosion was computed using control samples to account for absorbed moisture. The average surface recession rate (g/s) and the erosion yield (g/atom of atomic oxygen) were computed for each material at each test condition.

The FAO test results are illustrated in Table VII below and show that the erosion yields of samples treated according to the present invention are about two orders of magnitude lower than the erosion yield of untreated polymer samples. The maximum erosion yields shown for each of the modified samples are determined from the error associated with the measurement of the mass, and the duration of the test. All erosion yield values were confirmed using scanning electron microscopy (SEM) surface micrographs to check for surface morphology changes on the polymer surface after FAO testing. All samples that exhibited a marked decrease in erosion yield exhibited no surface morphology changes on a microscopic level.

TABLE VII

Erosion Yield for Materials

| Material | Erosion Yield (g/atom) |
|---|---|
| Kapton 500 HN | |
| Pristine | $4.3 \times 10^{-24}$ |
| After functionalization | $<5.5 \times 10^{-26}$ |
| Al-Kapton | |
| Pristine | $4.3 \times 10^{-24}$ |
| After functionalization | $<5.5 \times 10^{-26}$ |
| PEEK | |
| Pristine | $2.8 \times 10^{-24}$ |
| After functionalization | $<7.9 \times 10^{-26}$ |
| Polyethylene | |
| Pristine | $3.6 \times 10^{-24}$ |
| After functionalization | $<5.9 \times 10^{-26}$ |
| Carbon Fiber/PEEK | |
| Pristine | $2.2 \times 10^{-24}$ |
| After functionalization | $<7.5 \times 10^{-26}$ |
| PAN Fibers | |
| Pristine | $2.2 \times 10^{-24}$ |
| After functionalization | $<7.9 \times 10^{-26}$ |

Additional surface modification experiments were conducted with samples of PEEK and Kapton, and Tables VIII and IX below show the water contact angles and the surface compositions, as determined by XPS, for these samples.

TABLE VIII

Summary of Silylation with PEEK

| Sample Numbers | Treatment of Conditions | | | Water Contact Angle (°) | Elemental Compositions of Surfaces (at. %) | | | | | |
|---|---|---|---|---|---|---|---|---|---|---|
| | Ox* | Sl** | Co*** | | C | O | N | Si | O/C | Si/C |
| Control | | | | 72 | 85.6 | 12.7 | — | — | 0.15 | — |
| P-572 | + | | | 22 | 68 | 26 | 1.3 | 4.4 | 0.38 | 0.06 |
| P-573 | + | + | | 133 | 73 | 17 | — | 9.6 | 0.23 | 0.13 |
| P-571-2 | | + | | 90 | 76 | 18 | — | 6.2 | 0.24 | 0.08 |
| P-573Si | + | + | + | 0 | 25.5 | 48 | 1.2 | 25.5 | 1.88 | 1.00 |

*Ox - Photo-oxidized 20 min in air
**Sl - Silylated
***Co - Oxidatively Converted 90 min in air

TABLE IX

Summary of Silylation with Kapton 500 HN

| Sample Number | Treatment Conditions | | | | | Water Contact Angle (°) | Elemental Compositions of Surfaces in at. % | | | | | |
|---|---|---|---|---|---|---|---|---|---|---|---|---|
| | Ox* | W** | Sl' | An" | Co'" | | C | O | N | Si | O/C | Si/C |
| Pristine | | | | | | 72 | 79.6 | 14.3 | 5.4 | — | 0.18 | — |
| Control 1 | + | | | | | 21 | 75.0 | 19.0 | 6.5 | — | 0.25 | — |
| Control 2 | | | + | | | 90 | 73.3 | 16.4 | 6.1 | 4.2 | 0.22 | 0.06 |
| Control 3 | | | + | + | | 45 | 78 | 15 | 6.0 | 1.4 | 0.19 | 0.02 |
| Control 4 | | | + | | | 51 | 77 | 14 | 6.6 | 2.4 | 0.18 | 0.03 |
| 25 | + | | + | | | 90 | 65 | 16 | 5.2 | 14.0 | 0.25 | 0.22 |
| 25a | + | | + | + | | 104 | 57 | 22 | 3.9 | 18.0 | 0.39 | 0.32 |
| 25b | + | | + | + | + | 4 | 31 | 41 | 3.3 | 24.0 | 1.30 | 0.80 |
| 25c | + | | + | | + | 0 | 17 | 50 | — | 34.0 | 2.90 | 2.00 |

TABLE IX-continued

Summary of Silylation with Kapton 500 HN

| Sample Number | Treatment Conditions | | | | | Water Contact Angle (°) | Elemental Compositions of Surfaces in at. % | | | | | |
|---|---|---|---|---|---|---|---|---|---|---|---|---|
| | Ox* | W** | Sl' | An" | Co'" | | C | O | N | Si | O/C | Si/C |
| K65+ | + | | + | | + | — | 24 | 52 | 1.6 | 22 | 2.20 | 0.90 |
| K67+ | + | | + | | + | — | 38 | 39 | 0.1 | 23 | 1.10 | 0.60 |
| 27 | | + | | | | 51 | 77 | 15 | 6.2 | — | 0.19 | — |
| 27a | | + | + | | | 94.5 | 64 | 18 | 5.0 | 13 | 0.28 | 0.20 |
| 27b | | + | + | | + | 0 | 14 | 50 | 1.0 | 36 | 3.50 | 2.60 |
| 27c | | + | + | + | | 106.2 | 45 | 27 | 2.0 | 26 | 0.60 | 0.60 |
| 27d | | + | + | + | + | 4.4 | 26 | 44 | 3.1 | 28 | 1.70 | 1.10 |
| 36 | | + | + | | + | — | 25 | 45 | 2.0 | 28 | 1.80 | 1.12 |
| 37 | | + | + | + | + | — | 23 | 51 | 1.5 | 25 | 1.20 | 1.10 |

Ox* - Photo-oxidized 60 min in air
W** - Wet process
Sl' - Silylated
An" - Annealed
Co'" - Oxidatively Converted 60 min in air
+Photo-oxidized 20 min in air, Oxidatively Converted Stabilized 90 min in air FAO testing was conducted on a number of Kapton samples and the results are summarized in Table X, which shows the surface modification conditions under which the samples were prepared and the surface composition, as determined by XPS, of the samples.

TABLE X

XPS Suface Composition (at. %) of Kapton after FAO Testing

| | | Elements Detected | | | | |
|---|---|---|---|---|---|---|
| Sample | Treatment Controls | C | O | Si | N | Si/C |
| Control | — | 70 | 24 | — | 5.7 | — |
| 56-3 | Silylated | 47 | 41 | 8.7 | 3.0 | 0.18 |
| 56-1 | Photo-oxidized 20 min., Silylated, Annealed | 16 | 63 | 21 | 0.1 | 1.3 |
| 56-2 | Photo-oxidized 20 min., Silylated, Annealed, Oxidatively Converted 60 min. | 17 | 54 | 28 | 1.5 | 1.6 |
| 37 | Wet process activation, Silylated, Annealed, Oxidatively Converted 60 min. | 17 | 57 | 26 | 1.0 | 1.5 |
| 36 | Wet process activation, Silylated, Oxidatively Converted 60 min. | 14 | 53 | 33 | 0.6 | 2.3 |

Thermal Cycling Experiments

Thermal cycling, which can affect a spacecraft orbiting the Earth, is one of several space service environmental parameters that can affect materials. As the spacecraft passes in and out of the Earth's shadow, the temperature of the structure rises and falls. The minimum and maximum temperatures reached and the induced effects on the material are directly related to the properties of the material and any thermal control coatings. The materials may also experience thermal cycling as a result of structural members casting shadows on other parts of the structure.

Thermal cycling of silylated Kapton samples was conducted to estimate the mechanical and thermal properties of the modified materials. Liquid nitrogen dipping and fast transfer to the preheated oven at 120° C. and atmospheric pressure were used in six cycles with a period of about 20 minutes and amplitude of +120 to −180° C.

SEM analysis of samples before and after thermal cycling indicated slight morphological differences between the modified, silylated Kapton surface and the same surface after six thermal cycles. No cracking, however, was found on the surface of the thermally cycled sample, leading to a conclusion that the modified layer had a good thermal stress match with the bulk material.

Corona Discharge Experiments

Examples 17 to 20

In the following experiments, corona discharge was used for activation and/or oxidative stabilization of Kapton and polyethylene films. In Example 17, corona discharge was used both for activation and oxidative stabilization, whereas in Examples 18 and 19, corona discharge was used only for activation and oxidative stabilization, respectively. As shown by the results of Examples 17 to 19, corona discharge is acceptable both for activation and oxidative stabilization.

In Example 20, a polyethylene film was exposed to the process of the present invention utilizing corona discharge both for activation and oxidative stabilization. The results for water contact angle and surface composition of Example 20 are similar to those as set out in Tables III and VI for polyethylene.

All corona discharge experiments were carried out in ambient air, with a Sherman Solid State Treater™ generator, model GX10™, with adjustable power output (0–1 kW), equipped with a high-frequency generator (5–8 kHz), high-power transformer, and a movable bench top Electrode Box Unit consisting of two 1 by 30 cm discharge electrodes. The corona discharge takes place between the electrode and the surface of the film. The speed of the electrode Box could be adjusted continuously, the distance between the polymer surface and the electrode was fixed at 2 mm. The relative humidity was 55–65 %. The energy output, $E_u$, per unit of the substrate surface area was determined by $$E_u = P/LV,$$

where, P is power output (200 Watts), L is the length of the treating electrode (300 mm) and V is the Electrode Box velocity (16.7 mm/s).

Example 17

As-received 2 mil thick Kapton polyimide film measuring 10×10 cm was activated by corona discharge at an energy of 40 mJ/mm². After activation, the sample exhibited a water contact angle 24°.

The film was then silylated in a solution of 20% B[DMA]DS in p-xylene containing 7% NMP for about 15 minutes at 60° C. in a glass pot heated in an oven. The film was then washed in p-xylene and blown dry with air at room temperature. After silylation the sample had a water contact angle of 96°. Next, both sides of the silylated film were oxidatively converted using the same corona discharge unit at an energy of 40 mJ/mm$^2$. After oxidative stabilization the sample had a water contact angle of 0° and a surface composition of C-51.6, O-34.8, N-5.3, Si-8.4% at.

Example 18

Example 17 was repeated, except that the Kapton polyimide film after activation and silylation was oxidatively converted by exposure to UV in air at a distance of 25 mm from the UV source and exposed to a total dose of 2 J/cm$^2$. After oxidative stabilization the sample had a water contact angle of 0° and a surface composition of C-52.0, O-35.2, N-5.6, Si-7.2% at.

Example 19

Example 17 was repeated, except that the Kapton polyimide film was activated by UV in air. The sample was placed 25 mm from the UV source and was exposed for 10 minutes to a total dose of 1.3 J/cm$^2$ on both sides. After activation the sample had a water contact angle of 36°, after silylation—87°, and after oxidative stabilization the sample had a water contact angle of 0° and a surface composition of C-53.4, O-32.8, N-5.6, Si-8.2% at.

Example 20

Example 17 was repeated with Polyethylene 2.8 mil thick film instead of Kapton polyimide. The silylation was done in a solution of 25% B[DMA]DS in p-xylene for about 10 minutes at 40° C. After oxidative stabilization the sample had a water contact angle of 74° and a surface composition of C-44.5, O-36.1, N-1.1, Si-18.3% at.

Wet Process Activation

The following Example 21 describes a preferred process for wet activation of Kapton polyimide.

Example 21

As received 5 mil thick Kapton polyimide film measuring 10×10 cm was activated in a wet process as disclosed in M. M. Pleahaty and R. R. Thomas, J. *Electrochem. Soc.*, 139(3), 810 (1992) by hydrolysis in an aqueous 0.25M NaOH-solution for 3 hours at room temperature. At this stage, a portion of the polyimide has been converted to the sodium salt of polyamic acid. The salt was converted to the amic acid form after treatment with an aqueous 0.1 M acetic acid solution for an equal period of time and temperature. After activation, the sample had a water contact angle of 51° and a surface composition of C-77, O-15, N-6.2% at.

Silylation was done using a solution of 31% B[DMA]DS in p-xylene containing 7% NMP for about 10 minutes at 55° in a beaker heated on a hot plate. The film was then washed in p-xylene and blown dry with air at room temperature. After silylation, the sample had a water contact angle of 94° and a surface composition of C-64, O-18, N-5.0, Si-13% at.

Next, both sides of the silylated film were oxidatively converted by UV in air at a distance of 25 mm from the UV source, the total dose being 14 J/cm$^2$. After oxidative stabilization the sample had a water contact angle of 0° and a surface composition of C-14, O-50, N-1.0, Si-36.0% at.

Fabric

The inventors have found that the process of the present invention may be used to surface modify fabrics and fibers to alter properties such as hydrophobicity and soiling resistance.

Fabrics may preferably be treated according to the present invention by activation and silylation to produce fabrics having hydrophobic outer surfaces which shed water. Surface modification of a fabric having an appropriate fiber size and weave density would allow a fabric to be produced which is wind proof, water proof and water shedding, while being permeable to water vapor, i.e. "breathes", having properties similar to Gortex™.

The following Example 22 illustrates surface modification on both sides of a commercially available nylon polyamide fabric. The two-step surface modification process produced a dramatic change in the water contact angle of the fabric, increasing it from 0° to 140°, thus making the fabric very hydrophobic.

Example 22

Nylon polyamide fabric from Steadfast Corp. was modified by a two-stage process comprising activation and silylation. The as-received Nylon fabric displayed a water contact angle of 0°. The sample, measuring 10×10 cm was cleaned ultrasonically for 10 minutes in ethanol and dried at ambient conditions. Next, the sample was placed 25 mm from a UV source in air and exposed for 5 minutes to a total dose of 0.7 J/cm$^2$ on both sides. The fabric was then silylated in a solution of 25% B[DMA]DS in p-xylene for about 15 minutes at 55° C. in an oven. The fabric was then washed in p-xylene and dried at room temperature. After silylation the sample had a water contact angle of 140° and a surface composition of C-56.1, O-22.5, N-2.7, Si-18.7% at.

The sample was tested by putting it through two regular hot wash cycles with hot water and regular detergent. After two wash cycles the surface properties of the Nylon fabric were not substantially changed.

Although, in the above example, both sides of the fabric were treated by the surface modification process according to the present invention, it is to be understood that the process of the present invention also permits treatment of one side of a fabric or fiber. Although during activation, the fabric is surrounded by ozone, activation occurs only on the surfaces exposed directly to UV. Therefore, it is possible to activate one side of a fabric or fiber and not the other, or to mask off portions which are not be activated. This may be desired in some cases where, for example, it is desirable to provide different surface properties to a fabric or fiber on opposite sides thereof.

It would be expected that fabrics such as that treated according to Example 22 would have improved resistance to soiling and staining. Therefore, fabrics and fibers treated according to the process of the present invention have a large number of application, for example, hospital bedding, lab coats, surgical gowns, and carpeting.

The process of the present invention may also be used to modify the properties of fibers to be woven into fabrics.

Figure 7:
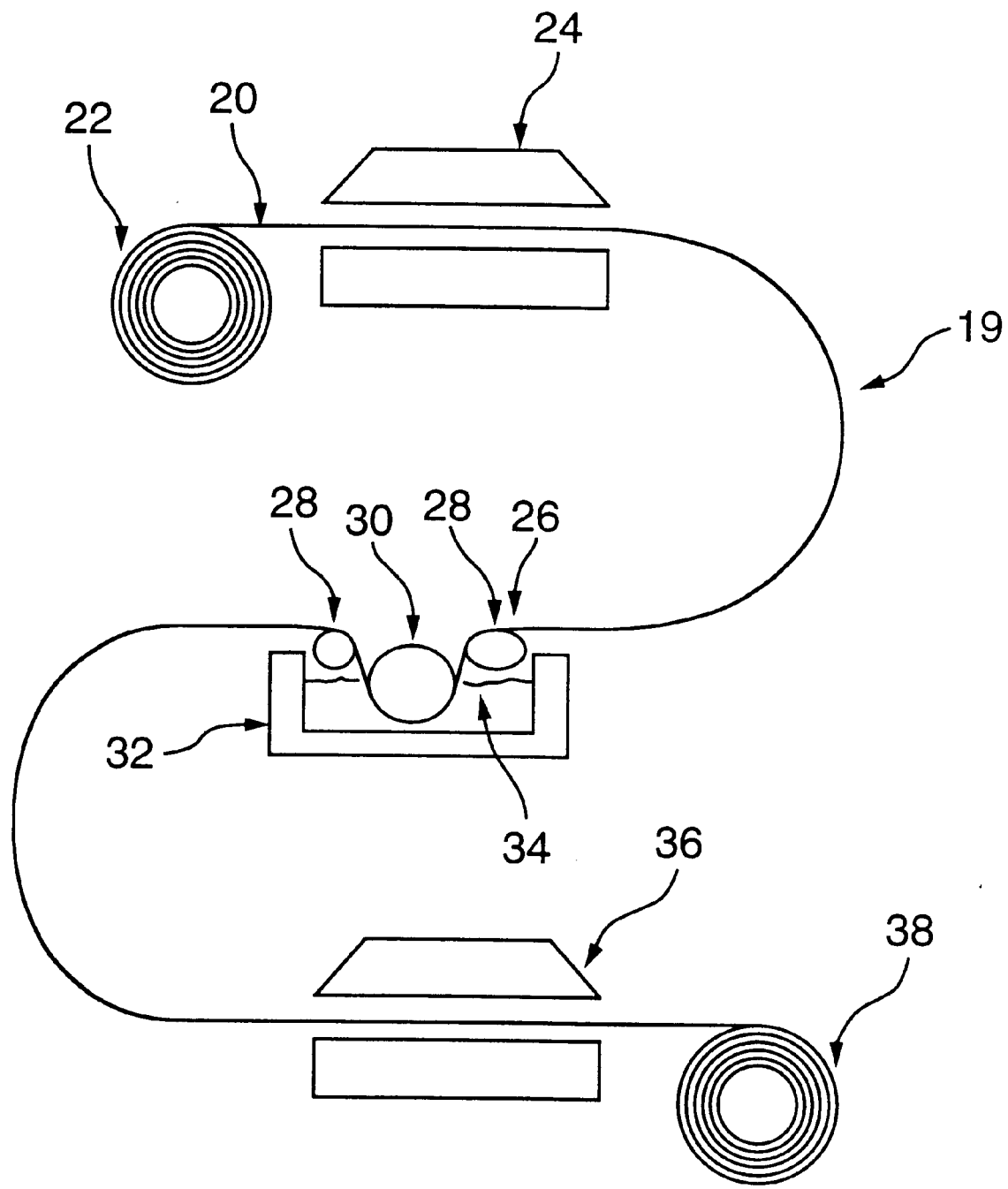
FIG. 7 is a schematic diagram of an apparatus to be used in an industrial process for surface modification of films and/or fabrics according to the present invention.

It is expected that the process of the present invention could be performed at the very high speeds (about 50 kilometers/hour) at which fabrics are processed. FIG. 7 is a schematic illustration of an apparatus 19 which may be used for surface modification of films, such as packaging films, fibers and fabrics. If desired, the final oxidative stabilization step may be eliminated, depending on the properties desired. For example, in surface modifications to produce hydrophobic fabrics, the final oxidative stabilization step is preferably omitted. However, for example, surface modification of packaging films to produce a silicon dioxide enriched surface layer therein includes the final oxidative stabilization step.

In the apparatus 19 shown by FIG. 7, a material 20 to be surface modified, such as a film, fabric or fiber, is unwound from feed spool 22 and passed through an activator 24 where it is activated according to the process of the present invention. Activator 24 preferably irradiates one or both sides of material 20 with UV radiation in the presence of ambient air to produce reactive hydrogen groups in material 20 as described above. The material 20 is passed through activator 24 at a sufficient rate, and activator 24 is preferably of sufficient length, so that material 20 passed therethrough is sufficiently activated.

Next, the material 20 moves through a silylation apparatus 26 where it is passed by spools 28 and 30 into a bath 32, where it is submerged in a solution 34 of silylating agent as discussed above. The material 20 is preferably submerged in solution 34 for a sufficient time to silylate substantially all the reactive hydrogen groups formed in activator 24.

In processes of the present invention including oxidative stabilization, material 20 is passed from silylation apparatus 26 to oxidative stabilization apparatus 36, which may be the same as the activator 24, to oxidatively convert silyl groups in silylated material 20 to silicon oxides. As in the activator, the rate of movement of material 20 and length of apparatus 36 are sufficient to oxidatively convert the silyl groups in the material as discussed above.

After, the material 20 is oxidatively converted, it may for example be taken up on uptake spool 38. In processes not including an oxidative stabilization step, material 20 may be fed directly from silylation apparatus 26 to uptake spool 38.

The process of the present invention may be used to modify a wide variety of fabrics and fibers, and is most advantageously used to modify fibers and fabrics made of materials which are substantially unreactive with silylating agents, such as polyamides and polypropylene.

The process of the present invention may be used to modify uncoated fibers or fibers coated with other substances such as dyes and sizing. However, it is to be appreciated that more permanent modification of fibers may be achieved by modification of fibers prior to coating with other substances.

In particular, medical textile materials composed of a woven nylon-type textile fabric were treated by the process of the invention. These treated textiles showed very considerable changes in their surface wettability, changing from being hydrophilic (advancing contact angles close to zero) to strongly hydrophobic (advancing contact angles of 130–140 degrees). It is well known that such changes strongly increase a textile surface's degreasing and non-fouling properties, a characteristic which is highly important for numerous applications. The observed property changes, such as developed surface hydrophobicity, remained unchanged even after two washes of the treated textile materials in a conventional washing machine using conventional detergents and a hot wash.

Weatherability

It has been found that polymers and polymer coatings which are exposed to terrestrial weathering exhibit similar surface morphology as polymeric materials eroded in the LEO space environment. It is believed that much of this weathering is caused by the effects of UV radiation from the sun, atmospheric oxygen, temperature, thermal cycling, and moisture in various forms.

The inventors have found that the process of the invention is useful for the protection of polymers from at least some of the above-mentioned factors, and is therefore useful for improving the weatherability properties of numerous types of substrates. Examples 23 to 25 and Table XI set out below show the results of weathering experiments conducted on samples of polymer-coated stainless steel sheets, the polymer coatings having been surface modified by the preferred three-step process of the present invention.

The results of these weathering experiments demonstrate that polymers and polymer coatings treated according to the present invention are resistant to terrestrial weathering, thus making them useful for building materials which are exposed to the elements, such as vinyl siding, polymer-coated steel or aluminum siding, polymeric roof tiles, etc.

Example 23

A piece of as-received stainless steel sheet, measuring 10×10 cm and covered by PVC Plastisol™ (sample QC 1504) was placed 25 mm from a UV source in air and exposed for 15 minutes to a total dose of 2 J/cm$^2$ on one side. After activation, the sample had a water contact angle of 48°, as compared to 79° for the original sample.

The sheet was then silylated in a solution of 25% B[DMA]DS in p-xylene for about 15 minutes at 40° C. in an oven. The sheet was then washed in p-xylene and dried at room temperature. After silylation the sample had a water contact angle of 95°. Next, for oxidative stabilization, the silylated sheet was placed 25 mm from a UV source in air and exposed to a total dose of 10 J/cm$^2$. After oxidative stabilization the sample had a water contact angle of 95° and a surface composition of C-44.9, O-32.5, Cl-0, Si-22.7% at.

A weatherability test was conducted for the treated sample using ASTM D 4587-91 standard (Table XI). As can be seen from Table XI, the general parameter of testing (gloss) confirms the absolute stability of the sample.

Example 24

Example 23 was repeated, except that the stainless steel sheet was covered by siloxane modified thermosetting polyester cured with melamine-formaldehyde resin (sample QC 273). The original sample had a water contact angle of 93°, after activation a water contact angle of 59°, and after silylation—102°. After oxidative stabilization, the sample had a water contact angle of 40° and a surface composition of C-22.7, O-49.7, N-1.7, Si-25.9% at. The results of weathering tests (Table IX) confirm the stability of the sample to a test period of 267 hours.

Example 25

Example 23 was repeated, except that the stainless steel sheet was covered by a thermosetting polyester cured with melamine-formaldehyde resin (Sample G 4). The original sample had a water contact angle of 74°, after activation a water contact angle of 30°, and after silylation—90°. After oxidative stabilization the sample had a water contact angle of 95° and a surface composition of C-24.1, O-48.7, N-5.6, Si-21.6% at. The results of weathering tests shown in Table XI confirm the stability of the sample.

TABLE XI

Gloss results from weathering tests on samples treated according to Examples 23 to 25

| Sample | Hours of Exposure | Type of Gloss, Degree | | | | | |
|---|---|---|---|---|---|---|---|
| | | 20 | | 60 | | 85 | |
| | | Treated | Untreated | Treated | Untreated | Treated | Untreated |
| QC 1504 | 0 | 1.4 | 1.7 | 15.4 | 16.6 | 27.8 | 21.3 |
| | 267 | 2.8 | 1.7 | 25.0 | 16.6 | 34.9 | 20.9 |
| | 475 | 3.0 | 1.2 | 25.9 | 14.2 | 37.3 | 21.2 |
| | 624 | 3.0 | 0.5 | 26.2 | 7.5 | 38.8 | 20.0 |
| QC 273 | 0 | 4.1 | 4.0 | 30.6 | 30.2 | 62.7 | 62.4 |
| | 267 | 4.4 | 1.1 | 29.0 | 5.4 | 55.6 | 35.6 |
| | 475 | 0.9 | 0.9 | 2.8 | 2.2 | 43.8 | 29.5 |
| | 624 | 0.9 | 0.9 | 2.8 | 2.1 | 39.0 | 24.5 |
| G 4 | 0 | 0.7 | 5.4 | 2.6 | 35.6 | 44.5 | 61.2 |
| | 267 | 0.8 | 0.8 | 2.9 | 5.2 | 40.8 | 43.9 |
| | 475 | 0.8 | 0.7 | 3.2 | 2.8 | 42.4 | 39.3 |
| | 624 | 0.8 | 0.7 | 3.8 | 2.3 | 42.0 | 35.1 | it was found that the weatherability of pure polyethylene films of 2.8 mil, treated by the process of the invention using corona discharge activation, was improved by almost 30% according to a series of accelerated weathering tests in an Atlas Weatherometer Model CT-65, using standard conditions which are used for testing of greenhouse films, namely irradiance of 0.35 W/m$^2$, with 1 hour cycle comprising exposure of the test sample to combined light and water spray conditions (51 min. of light followed by 9 min. of combined water spray and light).

Weathering tests were also performed on other steel samples, coated either with a siloxane-modified thermosetting polyester cured with melamine-formaldehyde resin or with PVC Plastisol. These coatings were applied to sheet steel by a proprietary, industrially-developed process to increase the corrosion resistance of the steel material in different (ambient) weathering conditions. The process of the invention was applied to the coated samples for additional improvement of the performance of the samples in weathering conditions. Gloss and colour change measurements were performed after accelerated weathering in a weatherometer similar to that described above. These measurements were supported by XPS analysis and contact angle measurements. The results of all these tests have shown a significantly improved performance of the samples after being treated by the process of the invention, with less colour changes and gloss loss than for control samples, and therefore a significantly improved stability in weathering testing conditions.

The process of the present invention may also be used to produce membranes having unique properties. As discussed above, the present invention permits surface treatment of one side of a film or membrane, and therefore membranes may be provided having different wettabilities on their two sides. This may affect fluid transfer and increase through rate of membranes such as reverse osmosis membranes.

Other membranes which may be treated according to the present invention are bio-compatible medical membranes and "artificial skin", with the surface modification process of the present invention being used to improve bio-stability and blood and tissue compatibility of such membranes.

As discussed above, the present invention may be used to modify fibers to have different degrees of wettability, thus permitting the production of fibers having increased absorption for use in diapers, bandages, etc.

Carbon fibers and carbon fiber reinforced polymeric materials are discussed above as possible substrates for the surface modification process of the present invention. It is known that agents are frequently added to such composite materials to improve the compatibility between the fibers and the polymer matrix. The treatment of carbon fibers with the process of the present invention prior to incorporation in the matrix would be expected to improve compatibility between the fibers and the matrix and reduce or eliminate the need to add compatibility agents.

The process of the present invention may also be used to improve adhesion between other problematic combinations of materials. For example, it may be desirable to provide polymer coatings treated according to the present invention on steel to improve adhesion of paints thereto, and for example to enhance adhesion of urethane and siloxane in medical devices. Similarly, electronic devices frequently contain metallized polymers such as copper-coated Kapton. Treatment of Kapton according to the present invention prior to metallization may help adhesion to the metal film.

One particularly serious problem involving adhesion of polymers exists in bonding together the two most important materials in the field of biomaterials, namely silicone and polyurethane. The process of the invention was applied to commercially available polyurethane catheters that were afterwards bonded by a commonly-used adhesive to silicone tubes. The control and modified samples were then tested in a durometer, and a statistically significant increase of almost 30% in the maximum load was found for the joint made with the modified catheters.

The process of the present invention may also be used to produce "fog-resistant" articles, films and coatings. For example, fogging of greenhouses is a problem since it prevents light from entering the greenhouse. The process of the present invention allows production of films having, for example, a hydrophilic surface which causes water to sheet rather than form tiny droplets, which is believed to be at least partially responsible for fogging.

Although the invention has been described in connection with certain preferred embodiments, it is not intended that it be limited thereto. Rather, it is intended that the invention cover alternate embodiments as may be within the scope of the following claims.

We claim:

1. A process for modification of a surface of a solid substrate selected from the group consisting of organic polymers, metallized polymer films, graphite and carbon fiber reinforced composite materials, the substrate prior to modification being substantially unreactive with a silylating agent, the process comprising:

(a) irradiation of the surface of the substrate with a dose of ultraviolet radiation, in the presence of oxygen, sufficient to cause the formation of reactive hydrogen groups in a surface region of the substrate, wherein the dose of ultraviolet radiation is from about 0.7 J/cm$^2$ to about 5 J/cm$^2$ and the reactive hydrogen groups are selected from one or more members of the group consisting of OH, OOH and COOH groups;

(b) silylation of at least a portion of the reactive hydrogen groups in the surface region of the substrate with the silylating agent, wherein the silylating agent contains organosilicon groups which become incorporated in the surface region of the substrate; and (c) oxidative stabilization of the surface of the substrate comprising oxidation of the organosilicon groups in at least an outer portion of the surface region, wherein the surface of the substrate after the oxidative stabilization comprises C, O and Si, with Si content at the surface being from about 20 atom percent to about 40 atom percent.

2. The process of claim 1, wherein the dose of ultraviolet radiation is from about 2 J/cm$^2$ to about 5 J/cm$^2$, the ultraviolet radiation having a wavelength of from about 185 nm to about 254 nm.

3. The process of claim 1, wherein the oxidative stabilization is selected from the group consisting of irradiation of the surface of the substrate with ultraviolet radiation in the presence of oxygen, corona discharge, and bombardment of the surface of the substrate with fast atomic oxygen or oxygen plasma.

4. The process of claim 3, wherein the oxidative stabilization comprises irradiation of the surface of the substrate with a dose of from about 7 J/cm$^2$ to about 30 J/cm$^2$ of ultraviolet radiation in the presence of oxygen, the ultraviolet radiation in the oxidative stabilization having a wavelength of from about 185 nm to about 254 nm.

5. The process of claim 4, wherein the dose of ultraviolet radiation in the oxidative stabilization is about 14 J/cm$^2$.

6. The process of claim 1, wherein the surface of the substrate after the oxidative stabilization comprises about 10–25 atom percent C, about 40–60 atom percent O, and about 20–40 atom percent Si.

7. The process of claim 1, wherein the substrate is selected from the group consisting of:

(a) an organic polymer selected from the group consisting of polyolefins, polyurethanes, polysiloxanes, halogenated polyolefins, polyesters, polyimides, polyamides and polyethers;

(b) composite materials comprising graphite fibers in a polymeric resin matrix;

(c) a metallized polymer film comprising an aluminized film of polyimide; and (d) graphite fibers produced from polyacrylonitrile.

8. The process of claim 7, wherein the substrate is an organic polymer selected from the group consisting of polyethylene, poly(vinyl chloride), poly(ethylene terephthalate), poly (ether ether)ketone, and polyimides.

9. The process of claim 1 wherein the steps of irradiation and silylation are carried out such that formation of reactive hydrogen groups and silylation of at least a portion of the reactive hydrogen groups occurs from the surface to a depth below the surface in the range of about 200 nm to about 1000 nm.

10. A process for modification of a surface of a solid substrate selected from the group consisting of organic polymers, metallized polymer films, graphite and carbon fiber reinforced composite materials, the substrate prior to modification being substantially unreactive with a silylating agent, the process comprising:

(a) surface activation of the solid substrate comprising formation of reactive hydrogen groups in a surface region of the substrate, wherein the reactive hydrogen groups are selected from one or more members of the group consisting of OH, OOH and COOH groups;

(b) silylation of at least a portion of the reactive hydrogen groups in the surface region of the substrate with the silylating agent, wherein the silylating agent contains organosilicon groups which become incorporated in the surface region of the substrate; and (c) oxidative stabilization of the organosilicon groups in at least an outer portion of the surface region, the outer portion having an erosion yield on the order of or less than about $10^{-26}$ g/atom of atomic oxygen when the surface of the substrate is exposed to the atomic oxygen having a kinetic energy of from about 1 eV to about 5.3 eV.

11. The process of claim 10, wherein the surface activation is selected from the group consisting irradiation of the surface of the substrate with ultraviolet radiation in the presence of oxygen, and corona discharge.

12. The process of claim 11, wherein the surface activation comprises irradiation of the surface of the substrate with a dose of from about 0.7 J/cm$^2$ to about 5 J/cm$^2$ of ultraviolet radiation in the presence of oxygen, the wavelength of the ultraviolet radiation being from about 185 nm to about 254 nm.

13. The process of claim 12, wherein the dose of ultraviolet radiation in the surface activation is from about 2 J/cm$^2$ to about 5 J/cm$^2$.

14. The process of claim 10, wherein the substrate is selected from the group consisting of:

(a) an organic polymer selected from the group consisting of polyolefins, polyurethanes, polysiloxanes, halogenated polyolefins, polyesters, polyimides, polyamides and polyethers;

(b) composite materials comprising graphite fibers in a polymeric resin matrix;

(c) a metallized polymer film comprising an aluminized film of polyimide; and (d) graphite fibers produced from polyacrylonitrile.

15. The process of claim 14, wherein the substrate is an organic polymer selected from the group consisting of polyethylene, poly(vinyl chloride), poly(ethylene terephthalate), poly(ether ether)ketone, and polyimides.

16. The process of claim 15, wherein the substrate is polyimide and the surface activation of the substrate comprises a wet chemical process wherein the surface of the substrate is first treated with a base and subsequently neutralized with acid to form polyamic acid functional groups in the surface region of the substrate.

17. The process of claim 10, wherein the oxidative stabilization is selected from the group consisting of corona discharge, bombardment of the surface of the substrate with fast atomic oxygen or oxygen plasma, and irradiation of the surface of the substrate with ultraviolet radiation in the presence of oxygen.

18. The process of claim 17, wherein the oxidative stabilization comprises irradiation of the surface of the substrate with a dose of from about 7 J/cm$^2$ to about 30 J/cm$^2$ of ultraviolet radiation in the presence of oxygen, the ultraviolet radiation in the oxidative stabilization having a wavelength of from about 185 nm to about 254 nm.

19. The process of claim 18, wherein the dose of ultraviolet radiation in the oxidative stabilization is about 14 J/cm$^2$.

20. The process of claim 10 wherein the steps of surface activation and silylation are carried out such that formation of reactive hydrogen groups and silylation of at least a portion of the reactive hydrogen groups occurs from the surface to a depth below the surface in the range of about 200 nm to about 1000 nm and the step of oxidative stabilization is carried out such that oxidation of the organosilicon groups occurs from the surface to a depth below the surface in the range of about 2 nm to about 200 nm.

* * * * *